United States Patent
Sunayama et al.

(10) Patent No.: US 6,898,698 B1
(45) Date of Patent: May 24, 2005

(54) DEVICE PREDICTING A BRANCH OF AN INSTRUCTION EQUIVALENT TO A SUBROUTINE RETURN AND A METHOD THEREOF

(75) Inventors: Ryuichi Sunayama, Kanagawa (JP); Masaki Ukai, Kanagawa (JP); Aiichiro Inoue, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/533,042

(22) Filed: Mar. 22, 2000

(30) Foreign Application Priority Data

Sep. 29, 1999 (JP) ............................................. 11-276221

(51) Int. Cl.[7] .............................................. G06F 15/00
(52) U.S. Cl. ...................... 712/233; 712/223; 712/234; 712/242
(58) Field of Search ................................ 712/223, 233, 712/234, 242

(56) References Cited

U.S. PATENT DOCUMENTS

| | | | | |
|---|---|---|---|---|
| 5,276,882 A | * | 1/1994 | Emma et al. ................ | 712/240 |
| 5,313,634 A | * | 5/1994 | Eickemeyer ................ | 712/240 |
| 5,790,845 A | * | 8/1998 | Shimada et al. ............. | 712/238 |
| 5,867,696 A | | 2/1999 | Okayama et al. | |
| 5,878,254 A | | 3/1999 | Shimada et al. | |
| 6,157,999 A | * | 12/2000 | Rossbach et al. ............ | 712/243 |

FOREIGN PATENT DOCUMENTS

| | | |
|---|---|---|
| JP | 57-86952 | 5/1982 |
| JP | 8-212075 | 8/1996 |
| JP | 8-292887 | 11/1996 |

OTHER PUBLICATIONS

Losq, J, "Subroutine Return Address Stack", Dec. 1981, IBM Technical Disclosure Bulletin, vol. 24, Issue 7A, pp. 3255–3258.*

IBM ESA/390 Principles of Operation, pp. 7–14–7–17.*

* cited by examiner

Primary Examiner—Jeffrey Gaffin
Assistant Examiner—Justin Knapp
(74) Attorney, Agent, or Firm—Staas & Halsey LLP

(57) ABSTRACT

A register number of a link register, which is specified by an instruction equivalent to a subroutine call, is registered. The number of a branch destination register in a branch instruction which can possibly be an instruction equivalent to a subroutine return is compared with the registered register number. If they match, this branch instruction is identified as an instruction equivalent to a subroutine return.

17 Claims, 18 Drawing Sheets

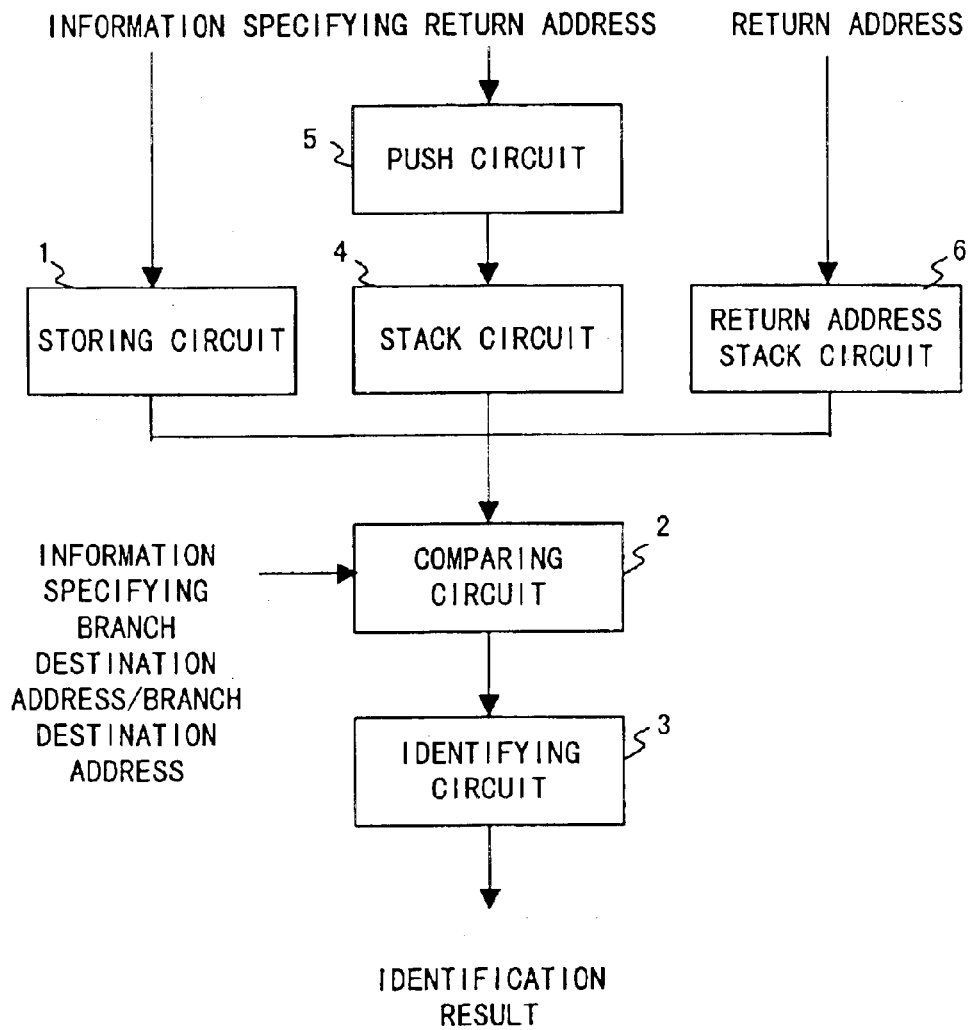
F I G. 2A

DEVICE PREDICTING A BRANCH OF AN INSTRUCTION EQUIVALENT TO A SUBROUTINE RETURN AND A METHOD THEREOF

BACKGROUND OF THE INVENTION

1. Field of the Invention

The present invention relates to an information processing device having a branch predicting mechanism and more particularly, to a branch predicting device predicting a branch of an instruction equivalent to a subroutine return in an architecture for which a particular instruction for a subroutine return is not prepared.

2. Description of the Related Art

For a conventional instruction processing device, its performance is attempted to be improved by sequentially starting the execution of succeeding instructions without waiting for the completion of the execution of one instruction by using the techniques such as pipeline processing, out-of-order processing, etc.

In the pipeline processing, if a preceding instruction is an instruction which changes the execution sequence of succeeding instructions, such as a branch instruction, the instruction at a branch destination must be entered to an execution pipeline when a branch is taken. Otherwise, the execution pipeline falls into disorder, and on the contrary, the performance is degraded in the worst case.

Accordingly, attempts are made to improve the performance by arranging a branch predicting mechanism, a representative of which is a branch history (branch prediction table), and by predicting whether or not a branch is taken. If it is predicted in such a device that a branch is taken, the instruction at a branch destination is entered to an execution pipeline after a branch instruction. Therefore, the execution pipeline never falls into disorder when the branch is actually taken.

Additionally, the branch destination (return destination) of a subroutine return instruction may vary at each execution from the nature of the instruction itself. This is because the location of the subroutine call instruction being a subroutine call source differs at each execution. For such an instruction, it is known that performance can be improved by arranging a dedicated branch predicting mechanism called a return address stack.

However, the above described conventional branch predicting mechanism has the following problems.

For some CPU (Central Processing Unit) architectures, particular instructions are not prepared beforehand as a subroutine call/return instruction pair. To improve the performance in such architectures by adopting a return address stack, the technique for dynamically extracting an instruction pair equivalent to a subroutine call/return from branch instructions to be executed, is required.

However, whether or not an instruction is a subroutine call/return instruction is statically determined at the time of decoding in a conventional information processing device. Therefore, programming different from the interpretation by hardware is undesirable. In this case, once the correspondence of a call/return pair differs from an actual one by undesirable programming, succeeding branch destinations are erroneously corresponded in succession from the nature of the return address stack. The more the number of the stages of the return address stack is, the worse the performance becomes.

FIG. 1 exemplifies a program including subroutine call/return instruction pairs used in such an architecture.

In this example, a subroutine S1 is called by an instruction "balr 14, 15" in a main routine (Call 1), and another subroutine S2 is further called by an instruction "balr 15, 13" in the subroutine S1 (Call 2). Then, control is returned to the subroutine S1 by a conditional return instruction "bcr 7, 15" (Return 2), and further returned to the main routine by an unconditional return instruction "bcr 15, 14" (Return 1).

Here, assume that the instruction processing device recognizes a particular operation code "balr" to be an instruction equivalent to a subroutine call, and an unconditional branch instruction "bcr 15, x" (x is arbitrary) including a particular operation code and operand to be an instruction equivalent to a subroutine return.

In this case, an instruction "bcr 7, 15" in the subroutine S2 is not recognized to be an instruction equivalent to a subroutine return, and is overlooked. Accordingly, a conventional return address stack recognizes Return 1 to be the return corresponding to Call 2, and a branch prediction results in a failure. Actually, the correct return corresponding to Call 2 is Return 2.

Additionally, if the instruction processing device simply recognizes all of instructions including the operation code "bcr" to be an instruction equivalent to a subroutine return, "bcr 4, 3" being a mere conditional branch instruction in the subroutine S2 is recognized to be the return corresponding to Call 2. Therefore, the return address stack is proved to erroneously recognize a call/return pair also in this case.

As described above, in an information processing device comprising a return address stack, it is vital to recognize a correct subroutine call/return instruction pair when instructions are executed.

SUMMARY OF THE INVENTION

An object of the present invention is to provide a branch predicting device which correctly recognizes an instruction equivalent to a subroutine return in an information processing device for which a particular instruction for the subroutine return is not prepared, and a method thereof.

In a first aspect of the present invention, a branch predicting device comprises a storing circuit, a comparing circuit, and an identifying circuit.

The storing circuit stores information specifying a return address of a subroutine when an instruction equivalent to a subroutine call is detected. The comparing circuit makes a comparison between information specifying a branch destination address of an instruction which can possibly be an instruction equivalent to a subroutine return and the information specifying the return address, which is stored in the storing circuit, when the instruction which can possibly be the instruction equivalent to the subroutine return is detected, and outputs the result of the comparison. The identifying circuit identifies the instruction equivalent to the subroutine return, which corresponds to the above described instruction equivalent to the subroutine call based on the result of the comparison.

In a second aspect of the present invention, a branch predicting device comprises a stack circuit, a push circuit, a comparing circuit, and an identifying circuit.

The stack circuit stores the information specifying a return address of a subroutine. The push circuit pushes the information specifying the return address onto the stack circuit.

The comparing circuit makes a comparison between information specifying a branch destination address of an instruction which can possibly be an instruction equivalent to a subroutine return and the information specifying the return address, which is stored in the top entry of the stack circuit, when the instruction which can possibly be the instruction equivalent to the subroutine return is detected, and outputs the result of the comparison. The identifying circuit identifies the instruction equivalent to the subroutine return, which corresponds to the above described instruction equivalent to the subroutine call based on the result of the comparison.

In a third aspect of the present invention, a branch predicting device comprises a return address stack circuit, a comparing circuit, and an identifying circuit.

The return address stack circuit stores the return address of a subroutine when an instruction equivalent to a subroutine call is detected. The comparing circuit makes a comparison between a branch destination address of an instruction which can possibly be an instruction equivalent to a subroutine return and the return address stored in the return address stack circuit, and outputs the result of the comparison. The identifying circuit identifies the instruction equivalent to the subroutine return, which corresponds to the above described instruction equivalent to the subroutine call.

BRIEF DESCRIPTION OF THE DRAWINGS

FIG. 2A is a block diagram showing the principle of a branch predicting device according to the present invention;

DESCRIPTION OF THE PREFERRED EMBODIMENTS

Figure 1:
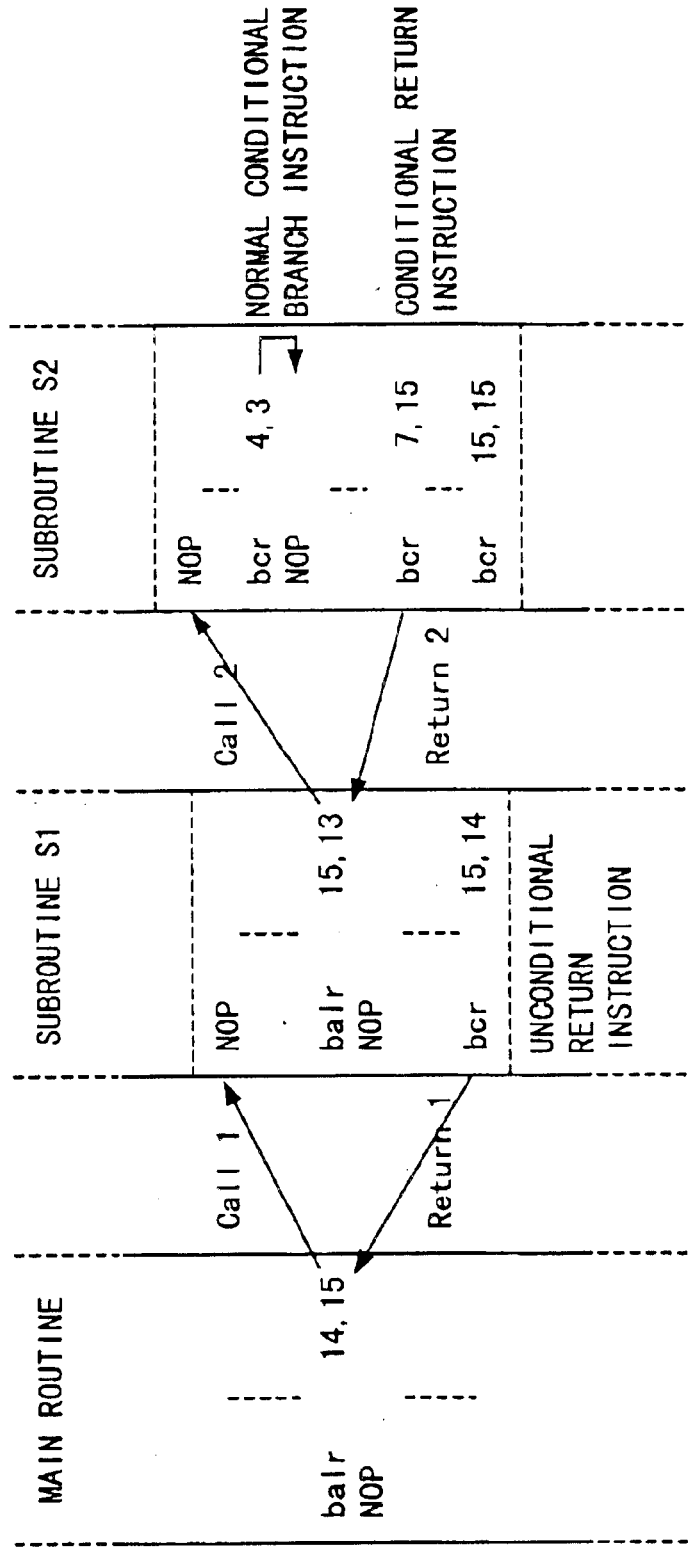
FIG. 1 is a schematic diagram showing a subroutine call/return instruction pair.

Preferred embodiments according to the present invention are hereinafter described in detail by referring to the drawings.

FIG. 2A is a block diagram showing the principle of a branch predicting device according to the present invention. In a first aspect of the present invention, the branch predicting device comprises a storing circuit 1, a comparing circuit 2, and an identifying circuit 3.

The storing circuit 1 stores information specifying a return address of a subroutine when an instruction equivalent to a subroutine call is detected. The comparing circuit 2 makes a comparison between information specifying a branch destination address of an instruction which can possibly be an instruction equivalent to a subroutine return and the information specifying the return address, which is stored in the storing circuit 1, and outputs the result of the comparison, when the instruction which can possibly be the instruction equivalent to the subroutine return is detected. The identifying circuit 3 identifies the instruction equivalent to the subroutine return, which corresponds to the above described instruction equivalent to the subroutine call, based on the result of the comparison.

If an executed instruction (or an instruction to be executed) is an instruction which performs an operation equivalent to a subroutine call, the return address specified by that instruction or the information about the register storing the return address, etc. is stored in the storing circuit 1 as the information specifying the return address.

If an executed instruction (or an instruction to be executed) can possibly be an instruction which performs an operation equivalent to a subroutine return, the branch destination address specified by that instruction or the information about the register storing a branch destination address, etc. is selected as the information specifying the branch destination address. Then, the comparison between the selected information and the information specifying the return address is made by the comparing circuit 2.

If the information specifying the branch destination address and the information specifying the return address match, the identifying circuit 3 identifies the latter instruction as an instruction equivalent to a subroutine return, which corresponds to the former. If they mismatch, the identifying circuit 3 identifies the latter instruction not as an instruction equivalent to a subroutine return, which corresponds to the former.

By using the information specifying a return address of a subroutine as described above, a correct instruction pair equivalent to a subroutine call/return can be dynamically extracted. Accordingly, the correspondence of a call/return pair can be correctly recognized, thereby preventing the correspondence from being improperly made.

In a second aspect of the present invention, the branch predicting device comprises a stack circuit 4, a push circuit 5, a comparing circuit 2, and an identifying circuit 3.

The stack circuit 4 stores information specifying a return address of a subroutine. The push circuit 5 pushes the information specifying the return address onto the stack circuit 4 when an instruction equivalent to a subroutine call is detected.

The comparing circuit 2 makes a comparison between information specifying a branch destination address of an instruction which can possibly be an instruction equivalent to a subroutine return and the information specifying the return address, which is stored in the top entry of the stack circuit 4, and outputs the result of the comparison, when the instruction which can possibly be the instruction equivalent to the subroutine return is detected. The identifying circuit 3 identifies the instruction equivalent to the subroutine return, which corresponds to the above described instruction equivalent to the subroutine call based on the result of the comparison.

When the instruction which performs an operation equivalent to the subroutine call is detected, the push circuit 5 pushes the information specifying the return address onto the stack circuit 4. When an instruction which can possibly be an instruction which performs an operation equivalent to the subroutine return is detected, the comparing circuit 2 makes a comparison between the information specifying the branch destination address of that instruction and the information specifying the return address, which is pushed onto the stack circuit 4.

If the information specifying the branch destination address and the information specifying the return address match, the identifying circuit 3 identifies the latter instruction as the instruction equivalent to the subroutine return, which corresponds to the former. If they mismatch, the identifying circuit 3 identifies the latter instruction not as the instruction equivalent to the subroutine return, which corresponds to the former.

By pushing the information specifying a return address of a subroutine onto the stack circuit 4 as described above, the correspondence of a call/return pair can be correctly recognized in a similar manner as in the branch predicting device in the first aspect, thereby preventing the correspondence from being improperly made.

In a third aspect of the present invention, the branch predicting device comprises a return address stack circuit 6, a comparing circuit 2, and an identifying circuit 3.

The return address stack circuit 6 stores a return address of a subroutine when an instruction equivalent to a subroutine call is detected. The comparing circuit 2 makes a comparison between a branch destination address of an instruction which can possibly be an instruction equivalent to a subroutine return and the return address stored in the return address stack circuit 6, and outputs the result of the comparison, when the instruction which can possibly be the instruction equivalent to the subroutine return is detected. The identifying circuit 3 identifies the instruction equivalent to the subroutine return, which corresponds to the above described instruction equivalent to the subroutine call based on the result of the comparison.

When the instruction which performs an operation equivalent to a subroutine call is detected, the return address specified by that instruction is pushed onto the return address stack circuit 6. Next, when the instruction which can possibly be an instruction which performs an operation equivalent to a subroutine return is detected, the comparing circuit 2 makes a comparison between the branch destination address of that instruction and the return address pushed onto the stack circuit 4.

If the branch destination address and the return address match, the identifying circuit 3 identifies the latter instruction as an instruction equivalent to a subroutine return, which corresponds to the former. If they mismatch, the identifying circuit 3 identifies the latter instruction not as the instruction equivalent to the subroutine return, which corresponds to the former.

By directly making a comparison between the return address pushed onto the return address stack circuit 6 and the branch destination address of an instruction as described above, the correspondence of a call/return pair can be correctly recognized in a similar manner as in the branch predicting device in the first aspect, thereby preventing the correspondence from being improperly made.

Figure 2B:
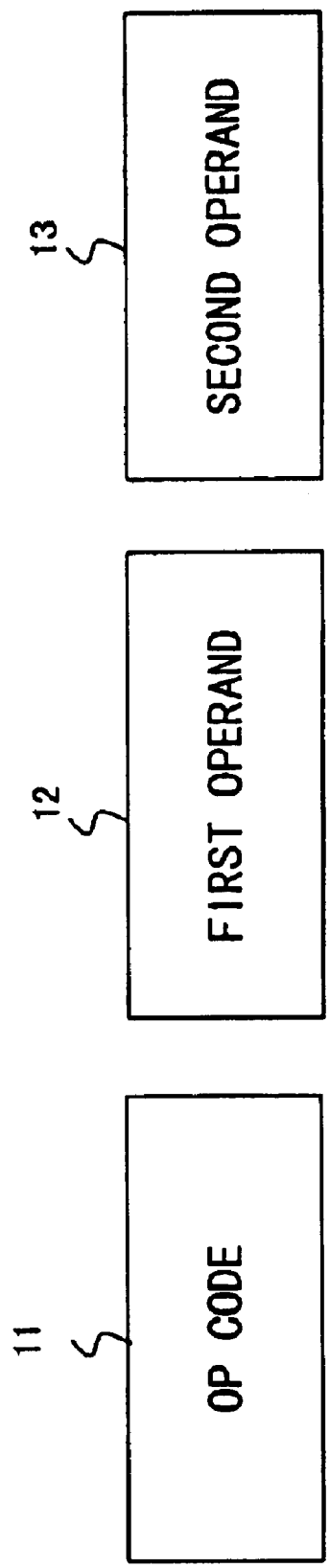
FIG. 2B shows an instruction code.
Figure 3:
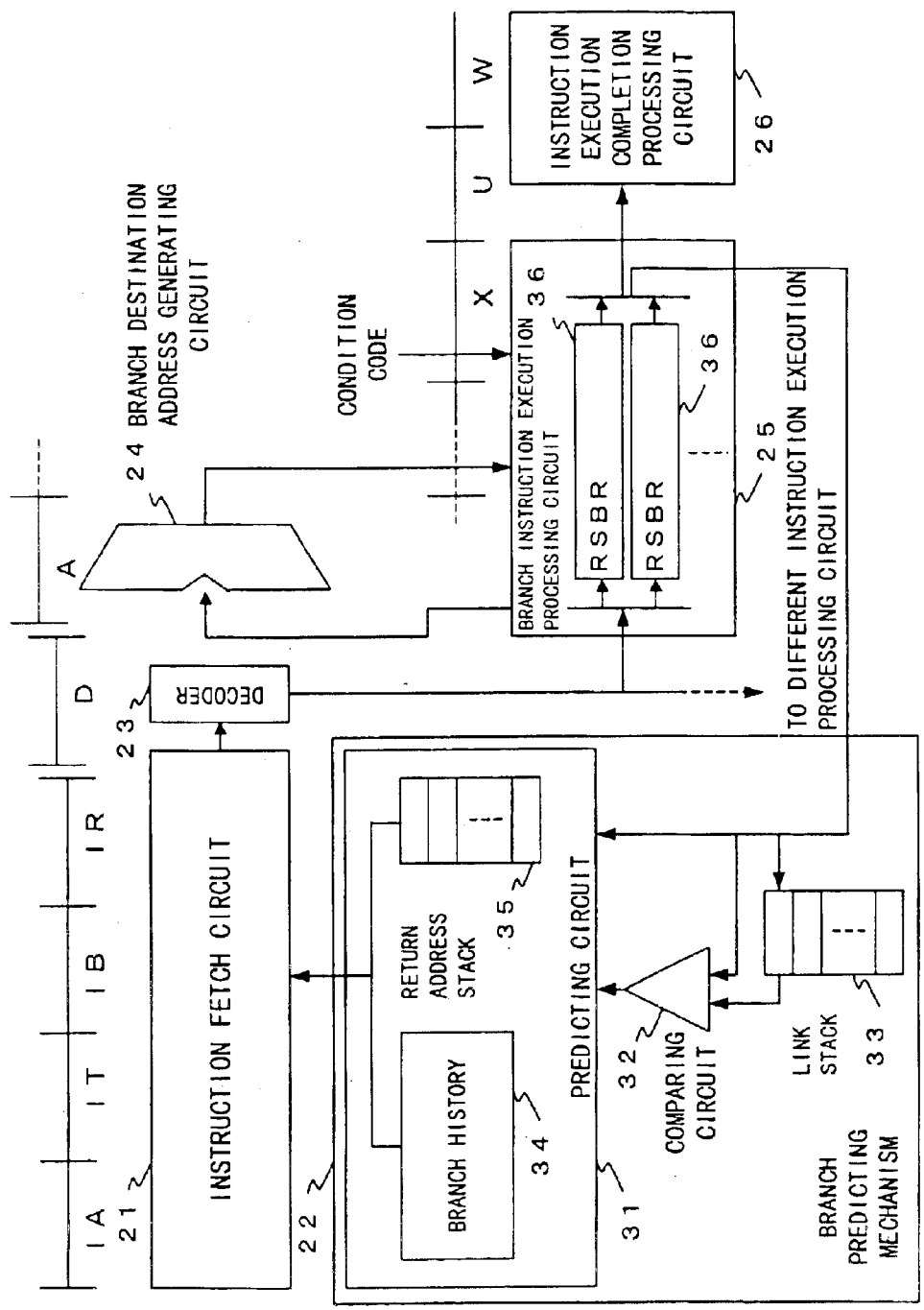
FIG. 3 is a block diagram showing the configuration of an instruction processing device.
Figure 11:
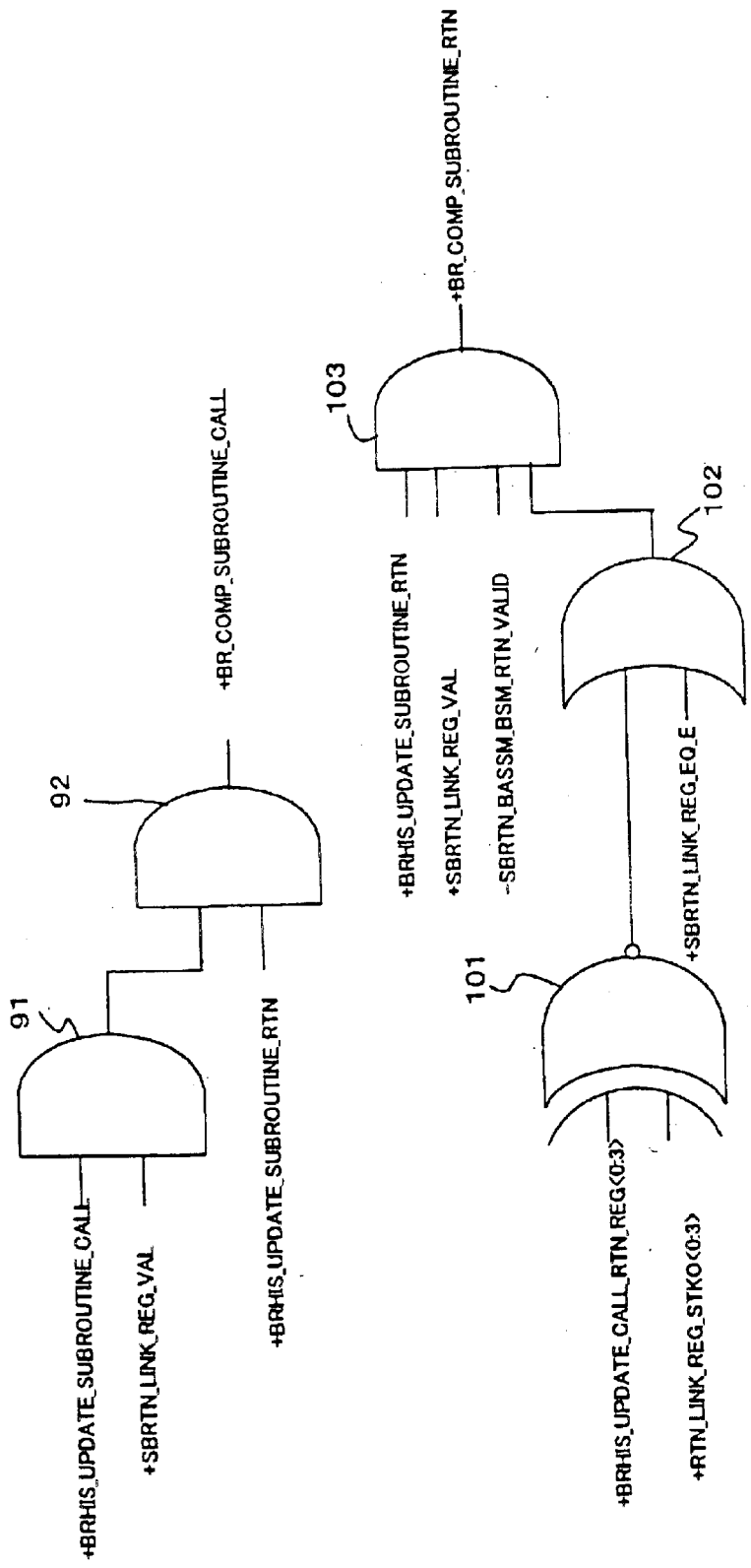
FIG. 11 shows a second determining circuit.
Figure 12:
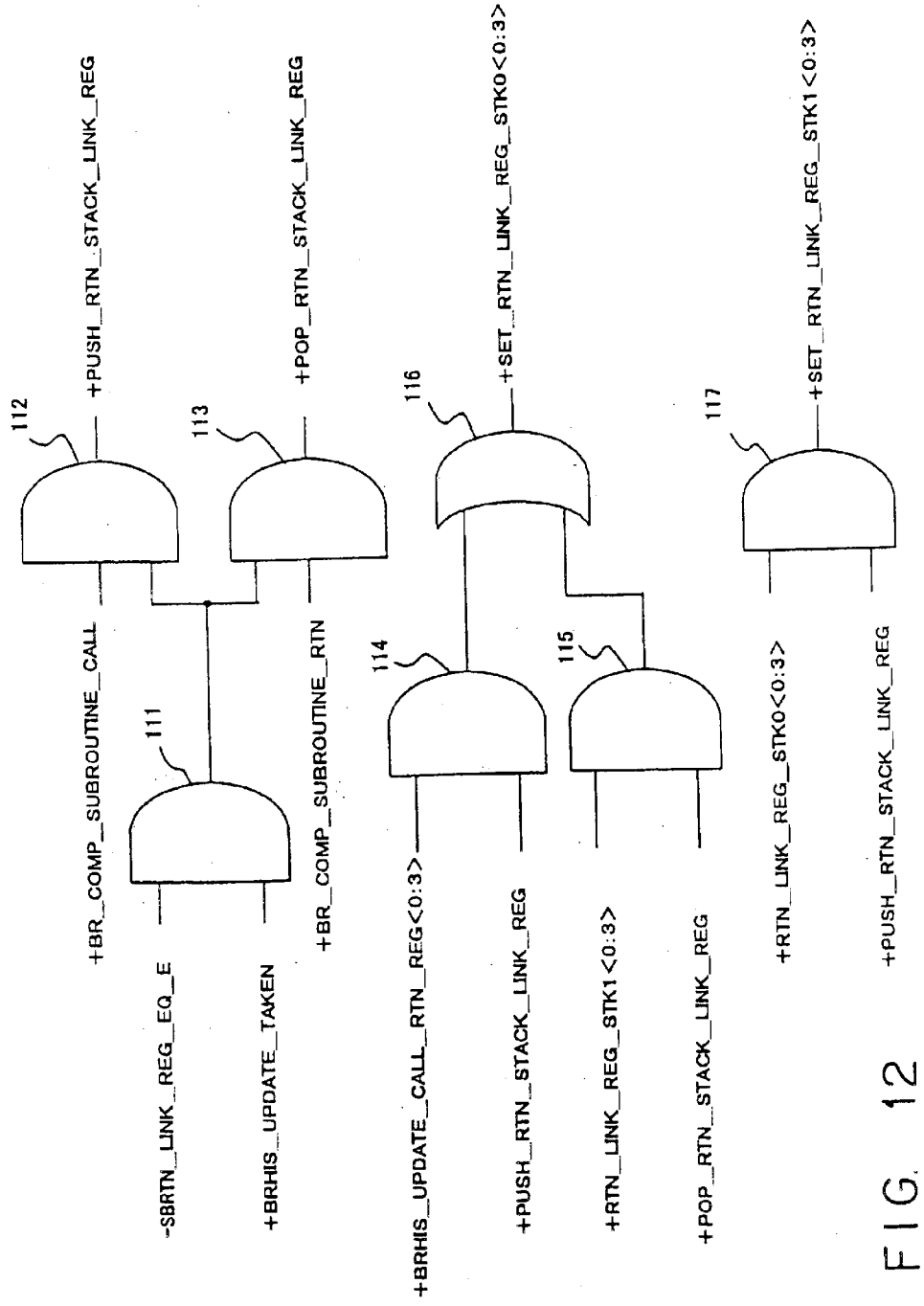
FIG. 12 shows a controlling circuit.
Figure 17:
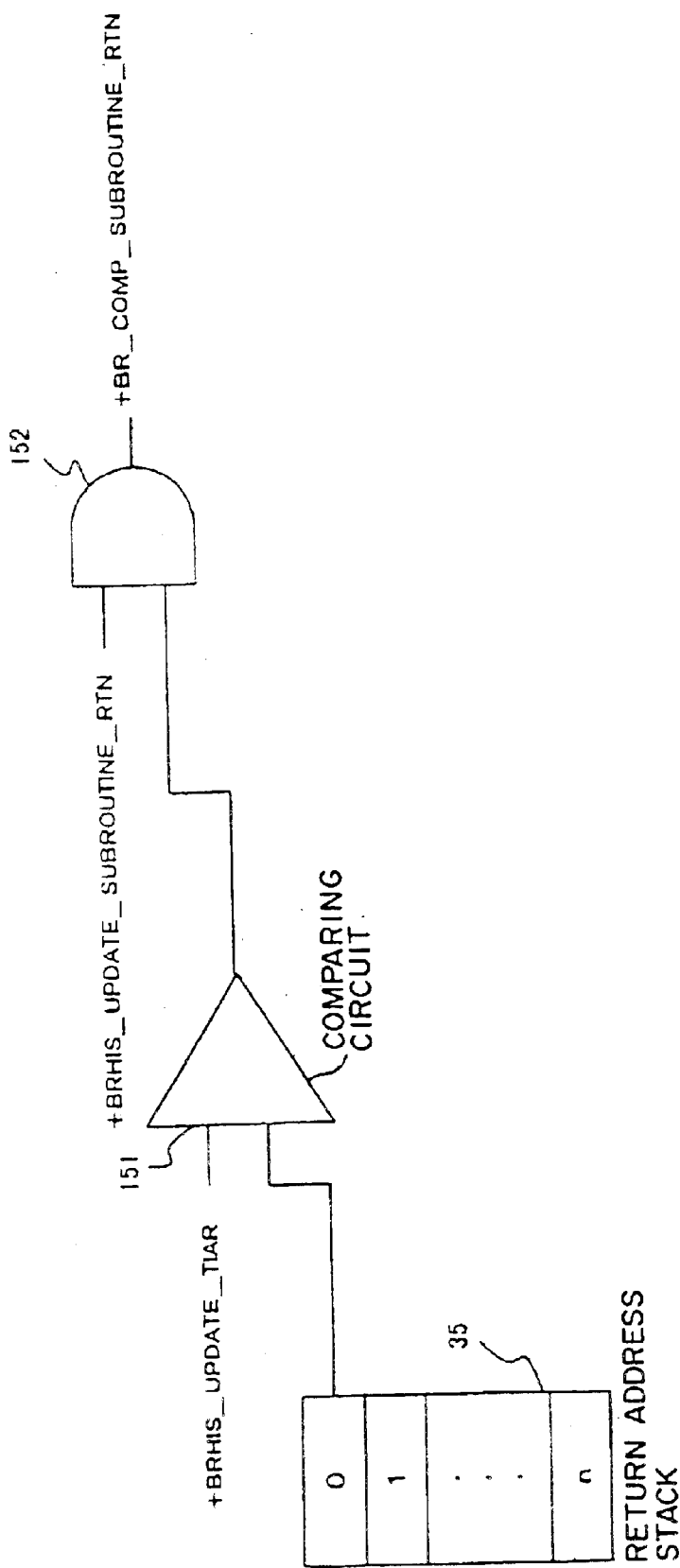
FIG. 17 shows a third determining circuit.

For example, the storing circuit 1 and the stack circuit 4, which are shown in FIG. 2A, correspond to a link stack 33 and a return address stack 35, which are shown in FIG. 3 and will be described later. Additionally, for instance, the comparing circuit 2 and the identifying circuit 3, which are shown in FIG. 2A, correspond to an EXNOR circuit 101, an OR circuit 102, and an AND circuit 103, which are shown in FIG. 11 and will be described later, or a comparing circuit 151 and an AND circuit 152, which are shown in FIG. 17 and will be described later. Furthermore, the push circuit 5 shown in FIG. 2A corresponds to a controlling circuit which is shown in FIG. 12 and will be described later, and the return address stack circuit 6 shown in FIG. 2A corresponds to the return address stack 35 shown in FIG. 3.

In an instruction processing device, a link register storing a return address is specified by an instruction equivalent to a subroutine call, and a branch by an instruction equivalent to a subroutine return is taken with the specified link register.

The instruction equivalent to a subroutine call or return includes, for example, an operation (OP) code 11, a first operand 12, and a second operand 13 as shown in FIG. 2B. In the instruction equivalent to a subroutine call, the first operand 12 represents the number of a link register. In the instruction equivalent to a subroutine return, the second operand 13 represents the number of the register storing a branch destination address.

In this preferred embodiment, a link stack registering the number of the link register specified at the time of a subroutine call is arranged. When a branch instruction that uses the address within the register having the number registered to the link stack as a branch destination address appears, this branch instruction is recognized to be an instruction equivalent to a subroutine return.

With such a control, instructions equivalent to subroutine call and return can be corresponded by using the number of a link register as link information, so that it becomes possible to dynamically extract an instruction pair equivalent to a subroutine call/return. Accordingly, the correspondence of the call/return pair can be correctly recognized, and the correspondence can be prevented from being improperly made, whereby the accuracy of a branch prediction by the return address stack can be improved.

For instance, in the example shown in FIG. 1, a correct call/return pair can be recognized by making rit the comparison between the number of the link register, which is included in a call instruction, and the number of the branch destination address register, which is included in a return instruction, which leads also to a successful branch prediction.

The first operand of the instruction "balr 14, 15" in Call 1 represents that the number of the link register is "14", while the second operand of the instruction "bcr 15, 14" in Return 1 represents that the number of the branch destination address register is "14". Accordingly, the latter instruction is recognized to be an instruction equivalent to a return, which corresponds to Call 1.

Furthermore, the first operand of the instruction "balr 15, 13" in Call 2 represents that the number of the link register is "15", while the second operand of the instruction "bcr 7, 15" in Return 2 represents that the number of the branch destination address register is "15". Accordingly, the latter instruction is recognized to be an instruction equivalent to a return, which corresponds to Call 2.

Next, the operations of the information processing device in this preferred embodiment will be explained in detail by using an example of an architecture for which a particular subroutine call/return instruction pair is not prepared. Such an architecture is stipulated, for example, by POO (Principles Of Operation) of ESA (Enterprise Systems Architecture)/390.

As an instruction available as a subroutine call, an instruction which can store in a register the return address (link address) used by an instruction equivalent to a subroutine return is considered. Examples of such an instruction include bal, balr, bas, basr, bassm, etc.

Additionally, an instruction available as a subroutine return, almost all of general branch instructions can be cited. Above all, a branch instruction specifying a branch destination address with one register, that is, an RR form instruction is apt to be used. Examples of the RR form instruction include bcr, bsm, etc. As a matter of course, these instructions are also used as a normal unconditional or conditional branch instruction.

Furthermore, there is a possibility that an instruction which can possibly cause an improper correspondence of a subroutine call/return pair exists in such an architecture, although its appearance frequency is low. As such an instruction, by way of example, an RX form instruction such as lpsw, bc, etc. can be cited. Also in some interrupt events, a subroutine call/return pair may be improperly corresponded in some cases.

The branch instruction in an RX form, the representative of which is bc, does not always specify the return address only with one register, and particularly, specifies a displacement in some cases. Besides, a return address may sometimes be changed by a process rewriting the value of the link register, etc.

If such an instruction is used as a subroutine return, the return address that is registered to the return address stack at the time of a call is not correct. Therefore, it is desirable not to reference the return address stack at the time of a return. Alternatively, a correct return address can possibly be obtained by referencing the predicted branch destination registered to a branch history, similar to a normal branch instruction.

Furthermore, lpsw does not directly specify a branch destination address with a register, and uses the data sequence in a memory, which is indicated by an operand, as a branch destination address. When such an instruction sequence appears, the correspondence of a call/return pair may not be maintained properly. Or, also when an interrupt occurs, a call/return pair can possibly make an improper correspondence depending on the type of the interrupt in a similar manner.

Accordingly, some mechanism must be embedded into a return address stack. As one way of embedding a mechanism, it is considered to erase all of the entries of a return address stack and a link stack when such instructions are executed or when such an interrupt occurs. With such a control, the correspondence of the return address stack can be prevented from being improperly made, whereby the performance degradation due to daisy-chained improper correspondences of subsequent prediction results, which are triggered by an initial occurrence, never takes place.

Furthermore, although fundamental branch instructions are implemented by hardwired, some branch instructions are sometimes controlled by microcode. This is because these instructions accompany other complicated operations. Such complicated branch instructions do not have an advantage of being registered to a branch history, since few benefits can be obtained despite the complexity of circuitry. For this reason, also a return address stack does not run.

As described above, however, if such complicated instructions can possibly be an instruction equivalent to a subroutine call or return, the return address stack is improperly corresponded on the condition that no measures are taken to these instructions, which leads to a degradation of performance.

Therefore, control is performed so that an instruction equivalent to a subroutine return is not recognized to be an instruction equivalent to a return in a branch history or a return address stack, when the instruction equivalent to the subroutine return, which is considered to correspond to a branch instruction equivalent to a subroutine call and unregistered to the branch history, is detected after the branch instruction is executed.

In addition, a particular register is used as a link register very frequently in some cases, for example, in the case where a particular register is recommended to be used as a link register by a programming guide, etc. In such a system, it is assumed that the instruction using the particular register is always recognized to be an instruction equivalent to a subroutine call or return. In this way, the entries of a link stack can be efficiently used, whereby a great effect can be obtained even with a small-scale link stack.

Furthermore, if "0" is specified as the register number of a branch destination address in a branch instruction, the branch is not taken. In such an architecture, it is impossible to determine a corresponding instruction equivalent to a subroutine return by using the register number "0" as link information. Accordingly, if "0" is specified as the number of the link register in the instruction equivalent to a subroutine call, this instruction is not recognized to be an instruction equivalent to a subroutine call.

FIG. 3 is a block diagram showing the configuration of an instruction processing device in this preferred embodiment. The instruction processing device shown in FIG. 3 comprises an instruction fetching circuit 21, a branch predicting mechanism 22, a decoder 23, a branch destination address generating circuit 24, a branch instruction execution processing circuit 25, and an instruction execution completion processing circuit 26. This device executes instructions with an out-of-order method. In the instruction processing device adopting the out-of-order method, succeeding instruction sequences are sequentially entered to a plurality of pipelines without waiting for the completion of the execution of one instruction in order to improve its performance.

The instruction fetching circuit 21 and the branch predicting mechanism 22 corresponds to the circuit of an instruction fetch pipeline. The branch predicting mechanism 22 comprises a predicting circuit 31, a comparing circuit 32, and a link stack 33. The predicting circuit 31 comprises a branch history 34, and a return address stack 35.

The decoder 23, the branch destination address generating circuit 24, the branch instruction execution processing circuit 25, and the instruction execution completion processing circuit 26 correspond to the circuit of an instruction execution pipeline. The branch instruction execution processing circuit 25 comprises a plurality of RSBRs (Reservation Stations for BRanch) 36.

The instruction fetch pipeline has an instruction address issuance cycle (IA), a table cycle (IT), a buffer cycle (IB), and a result cycle (IR). The instruction execution pipeline has a decode cycle (D), an address calculation cycle (A), an execution cycle (X), an update cycle (U), and a write cycle (W).

The RSBR 36 is a stack waiting for the process intended for controlling a branch instruction. The branch instruction execution processing circuit 25 can select an entry which can be processed in the stack, and can execute a branch instruction whenever necessary in an order different from that instructed by a program.

Among the branch instructions handled by the RSBR 36, bal, balr (except for balr 1, 14), bras, bas, and basr are handled as an instruction equivalent to a subroutine call, while bcr, bsm, and balr 1, 14 are handled as an instruction equivalent to a subroutine return. Although bassm is an instruction equivalent to a subroutine call, it is a complicated instruction which is not handled by the RSBR 36.

If a branch is proved to occur as a result of the execution of a branch instruction by the branch instruction execution processing circuit 25, the instruction address at the branch destination and the address of the branch instruction itself are registered to the branch history 34 as a pair. The instruction fetching circuit 21 searches the branch history 34 prior to the fetch of the next instruction and predicts a branch destination, at the time of fetching a branch instruction.

When the decoder 23 detects an instruction equivalent to a subroutine call, the number of the link register, which is represented by the operand of that instruction, is pushed onto the link stack 33, and the instruction address at a corresponding return destination is pushed onto the return address stack 35.

When the decoder 23 detects an instruction which can possibly be an instruction equivalent to a subroutine return, the comparing circuit 32 makes a comparison between the register number registered to the top entry of the link stack 33, and the number of the branch destination address register, which is represented by the operand of the detected instruction. If these two register numbers match, the comparing circuit 32 determines that the detected instruction is an instruction which performs an operation equivalent to a subroutine return, and outputs the result of the comparison to the predicting circuit 31.

At this time, the register number is popped from the link stack 33, and the corresponding instruction address is popped from the return address stack 35. The popped instruction address is passed to the instruction fetch circuit 21 as a predicted branch destination.

Figure 4:
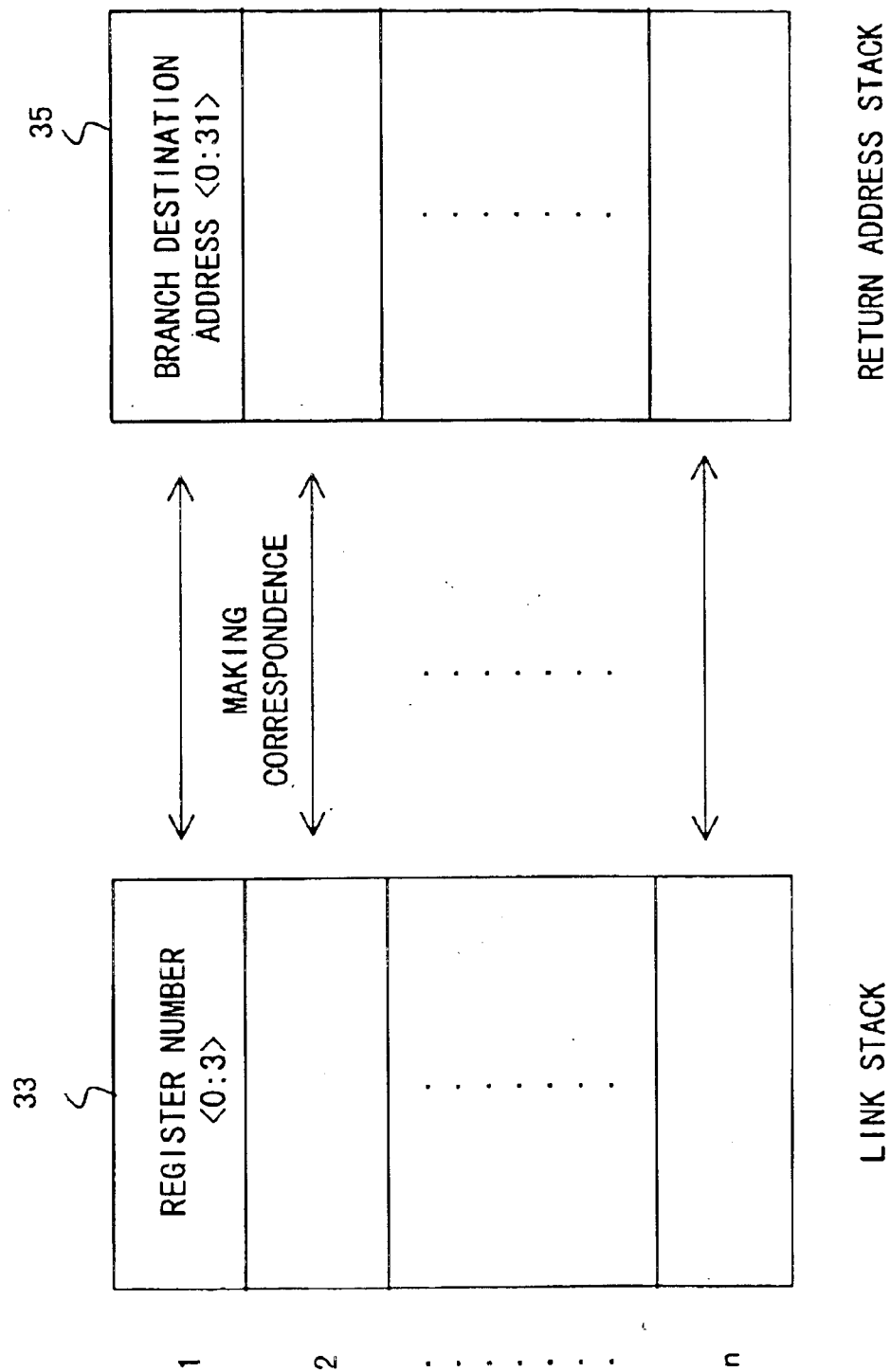
FIG. 4 is a schematic diagram showing the w correspondence between a link stack and a return address stack.

The entries of the link stack 33 correspond to those of the return address stack 35 one by one as shown in FIG. 4. These two stacks perform push and pop operations at the same time. Here, a 4-bit register number <0:3> is stored in the entry of the link stack 33, while a 32-bit branch destination address <0:31> is stored in the entry of the return address stack 35. These stacks are normally arranged as n-stage stacks composed of "n" (n≧1) entries.

Figure 5:
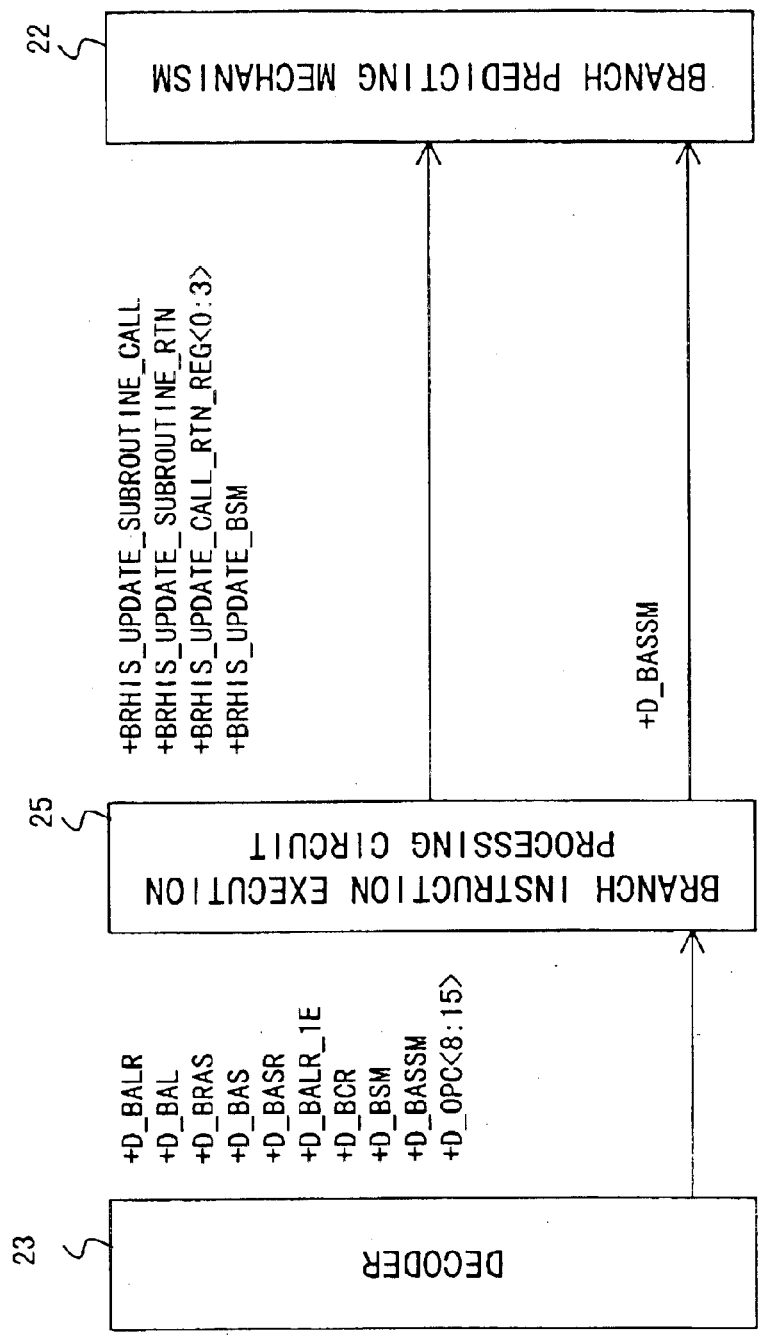
FIG. 5 is a schematic diagram showing the signals used by the instruction processing device.

FIG. 5 shows the signals used in the instruction processing device shown in FIG. 3. The decoder 23 outputs signals +D_BALR, +D_BAL, +D_BRAS, +D_BAS, +D_BASR, +D_BALR_1E, +D_BCR, +D_BSM, +D_BASSM, and +D_OPC<8:15> to the branch instruction execution processing circuit 25.

The signals +D_BALR, +D_BAL, +D_BRAS, +D_BAS, +D_BASR, +D_BALR_1E, +D_BCR, +D_BSM, and +D_BASSM respectively become a logic "1" when balr, bal, bras, bas, basr, balr 1, 14, bcm, and bassm are detected. The signal +D_OPC<8:15> represents the data of the bits of a machine language instruction.

The branch instruction execution processing circuit 25 outputs signals +BRHIS_UPDATE_SUBROUTINE_CALL, +BRHIS_UPDATE_SUBROUTINE_RTN, +BRHIS_UPDATE_CALL_RTN_REG<0:3>, +BRHIS_UPDATE_BSM, and +D_BASSM to the branch predicting mechanism 22.

The signal +BRHIS_UPDATE_SUBROUTINE_CALL becomes a logic "1" when an instruction is determined to be an instruction equivalent to a subroutine call. The signal +BRHIS_UPDATE_SUBROUTINE_RTN becomes a logic "1" when an instruction is determined to be an instruction which can possibly be an instruction equivalent to a subroutine return. The signal +BRHIS_UPDATE_CALL_RTN_REG<0:3> represents the number of the register specified by an instruction operand. The signal +BRHIS_UPDATE_BSM becomes a logic "1" upon completion of the execution of the bsm instruction.

Next, the configuration and the operations of the instruction processing device shown in FIG. 3 are explained in detail by referring to FIGS. 6 to 17.

When an instruction is decoded by the decoder 23, the signals shown in FIG. 5 are input to the RSBR 36, and an instruction equivalent to a subroutine call and an instruction which can possibly be an instruction equivalent to a subroutine return are determined. For the instruction which can possibly be the instruction equivalent to the subroutine return among them, a more strict correspondence with a subroutine return is identified by the circuit of the link stack 33, which will be described later.

Figure 6:
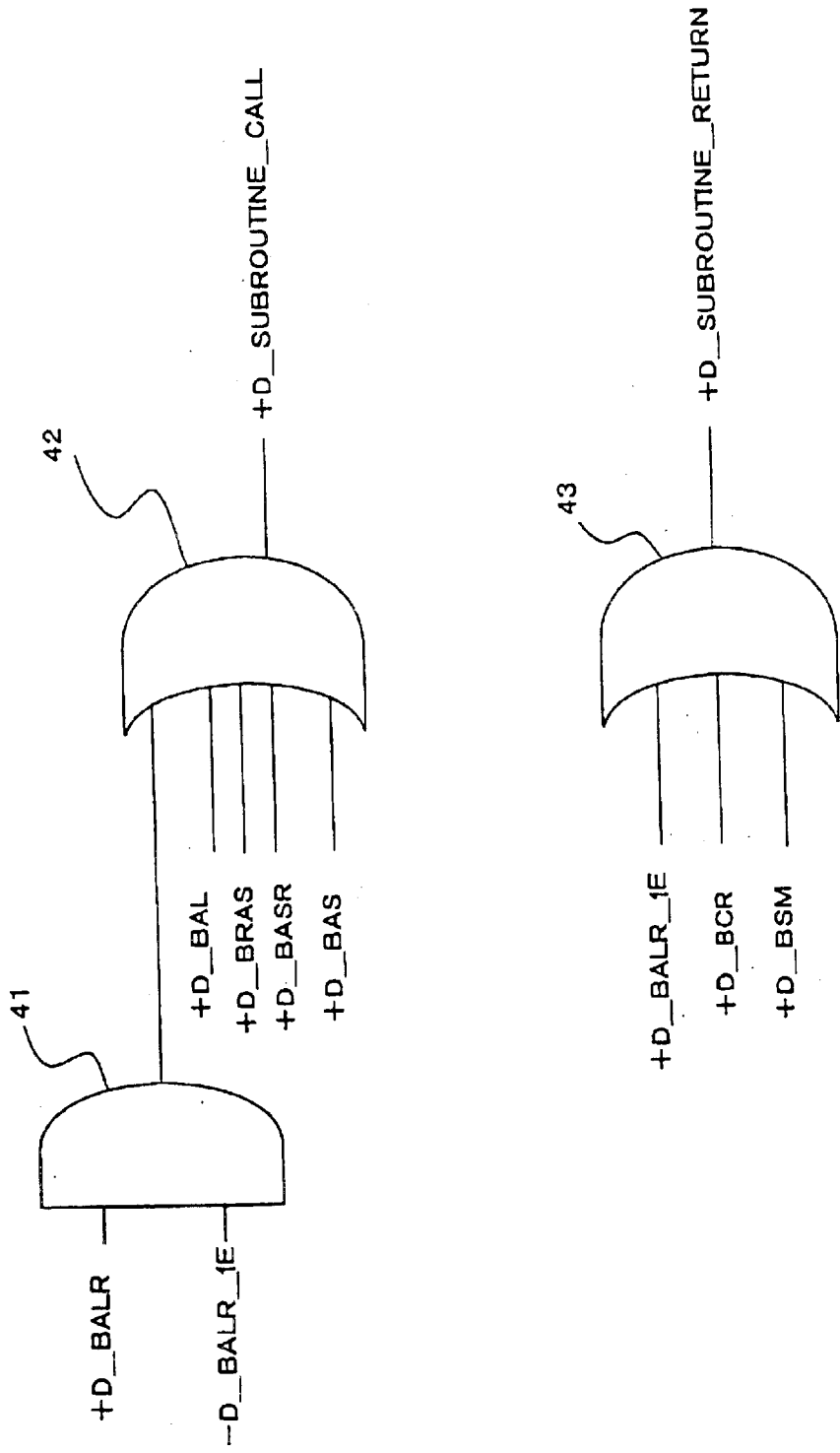
FIG. 6 shows a first determining circuit.

FIG. 6 shows a determining circuit within the RSBR 36. In this figure, an input signal −D_BALR_1E represents the negation of the signal +D_BALR_1E shown in FIG. 5, and becomes a logic "0" when the instruction "balr 1, 14" is decoded. An AND circuit 41 outputs the logical product of the input signals +D_BALR and −D_BALR_1E to an OR circuit 42. Accordingly, an instruction balr other than "balr 1, 14" are decoded, the output of the AND circuit 41 becomes a logic "1".

The OR circuit 42 outputs the logical sum of the output signal from the AND circuit 41 and the input signals +D_BAL, +D_BRAS, +D_BASR, and +D_BAS as a signal +D_SUBROUTINE_CALL. This signal +D_SUBROUTINE_CALL is used as a flag which becomes a logic "1" if a decoded instruction is an instruction equivalent to a subroutine call.

Additionally, an OR circuit 43 outputs the logical sum of the input signals +D_BALR_1E, +D_BCR, and +D_BSM as a signal +D_SUBROUTINE_RETURN. This signal +D_SUBROUTINE_RETURN is used as a flag which becomes a logic "1" if a decoded instruction is an instruction which can possibly be an instruction equivalent to a subroutine return.

If a decoded instruction is a branch instruction, the decoding result is normally registered to the RSBR 36. At this time, the flag representing the result of the determination of a subroutine call/return, and the information of a link register or a branch destination address register, etc. are registered to the RSBR 36.

With the architecture of ESA/390 POO, the number of the link register is specified in the bits <8:11> of an instruction (machine language instruction) which can possibly be an instruction equivalent to a subroutine call, and the number of the branch address register is specified in the bits <12:15> of an instruction (machine language instruction) which can possibly be an instruction equivalent to a subroutine return. Accordingly, the data of the bits <8:15> is registered as the information of these registers.

Figure 7:
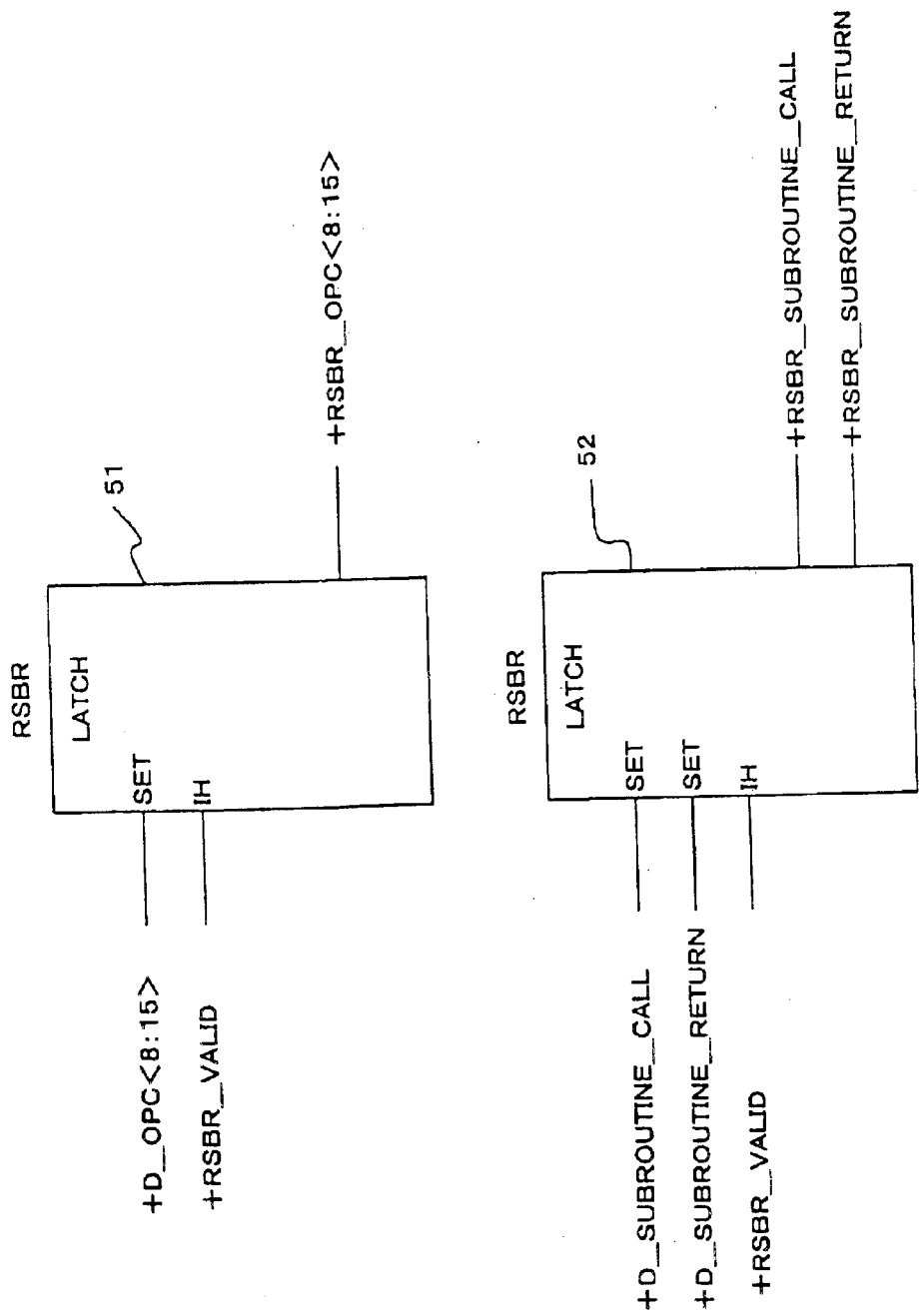
FIG. 7 shows a registering circuit.

FIG. 7 shows a registering circuit within the RSBR 36. In this figure, an input signal +RSBR_VALID becomes a logic "1" while the corresponding RSBR 36 is valid. A latch circuit 51 latches the value of the input signal +D_OPC<8:15>, and outputs the latched value as a signal +RSBR_OPC<8:15>.

A latch circuit 52 latches the value of the flags +D_SUBROUTINE_CALL and +D_SUBROUTINE_RETURN, which are generated by the determining circuit shown in FIG. 6, and outputs the latched values respectively as signals +RSBR_SUBROUTINE_CALL and +RSBR_SUBROUTINE_RETURN.

When the signal +RSBR_VALID becomes a logic "1", the registration of the information is terminated. The information registered to the latch circuits 51 and 52 is preserved while the corresponding RSSR 36 is valid.

Next, the subroutine call/return determination result and the register information registered to the RSBR 36, are transmitted to the branch predicting mechanism 22 simultaneously with the other branch history information, when the branch history information is updated. If the instruction is an instruction equivalent to a subroutine call, the number of the link register is selected as the register information. If the instruction is an instruction which can possibly be an instruction equivalent to a subroutine return, the number of the branch destination address register is selected as the register information.

Figure 8:
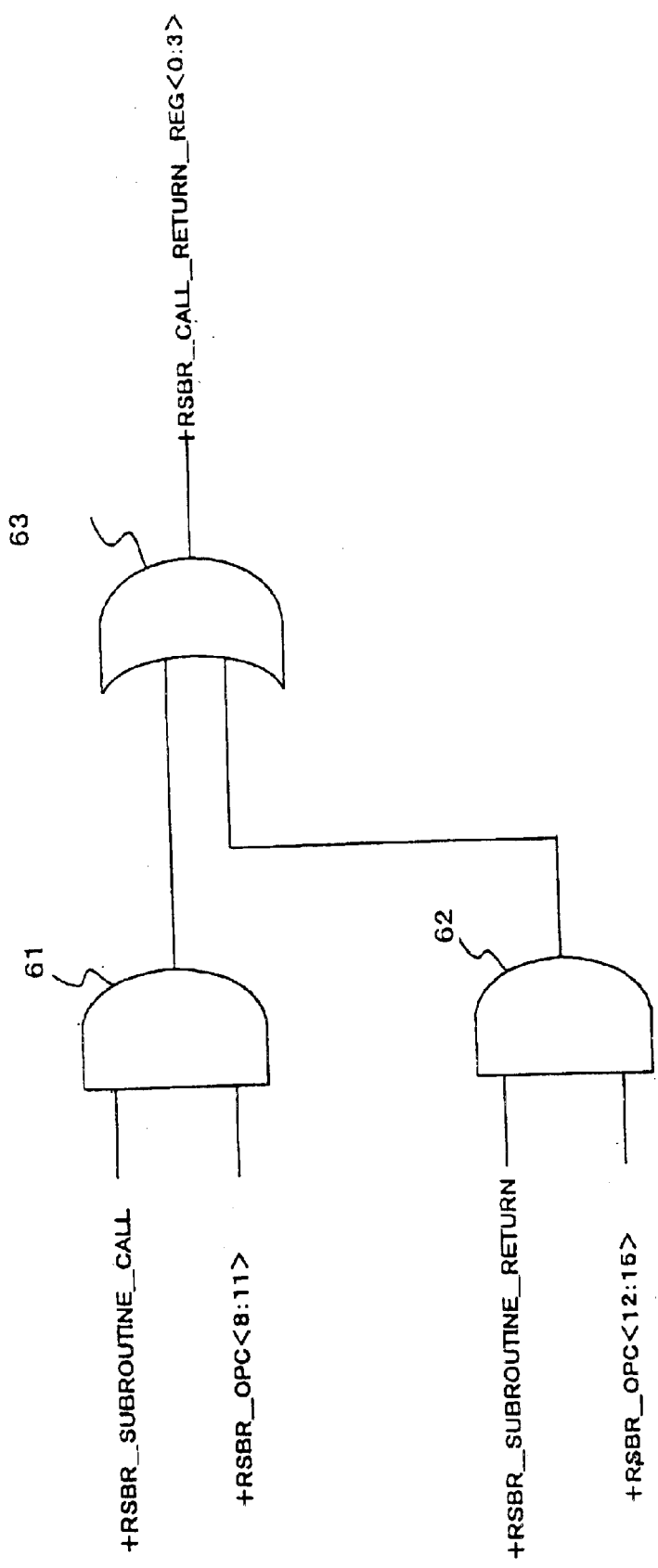
FIG. 8 shows a selecting circuit.

FIG. 8 shows a selecting circuit within the RSBR 36. In this figure, an AND circuit 61 outputs to an OR circuit 63 the logical product of the signals +RSBR_SUBROUTINE_CALL and +RSBR_OPC<8:11> from the registering circuit shown in FIG. 7. Accordingly, the number of the link register is output from the AND circuit 61 when the flag +RSBR_SUBROUTINE_CALL is set.

An AND circuit 62 outputs the logical product of the signals +RSBR_SUBROUTINE_RETURN and +RSBR_OPC<12:15> from the registering circuit shown in FIG. 7 to the OR circuit 63. Accordingly, the number of the branch destination address register is output from the AND circuit 62 when the flag +RSBR_SUBROUTINE_RETURN is set.

Then, the OR circuit 63 outputs the logical sum of the output signals from the AND circuits 61 and 62 as a signal +RSBR_CALL_RETURN_REG<0:3>. Here, since the flags +RSBR_SUBROUTINE_CALL and +RSBR_SUBROUTINE_RETURN are never set at the same time, the OR circuit 63 selectively outputs the output signals from the AND circuits 61 and 62.

The signals +RSBR_SUBROUTINE_CALL, +RSBR_SUBROUTINE_RETURN, and +RSBR_CALL_RETURN_REG<0:3> are output to the branch predicting mechanism 22 respectively as the signals BRHIS_UPDATE_SUBRUTINE_CALL, BRHIS_UPDATE_SUBROUTINE_RTN, and +BRHIS_UPDATE_CALL_RTN_REG<0:3>, which are shown in FIG. 5.

In the meantime, as described above, a branch is not taken if "0" is specified as the number of the branch destination address register in branch instructions (including an instruction equivalent to a subroutine return). Inversely, if "0" is specified as the number of the link register even in an instruction determined to be an instruction equivalent to a subroutine call when being decoded, it is desirable not to identify this instruction as an instruction equivalent to a subroutine call.

Figure 9:
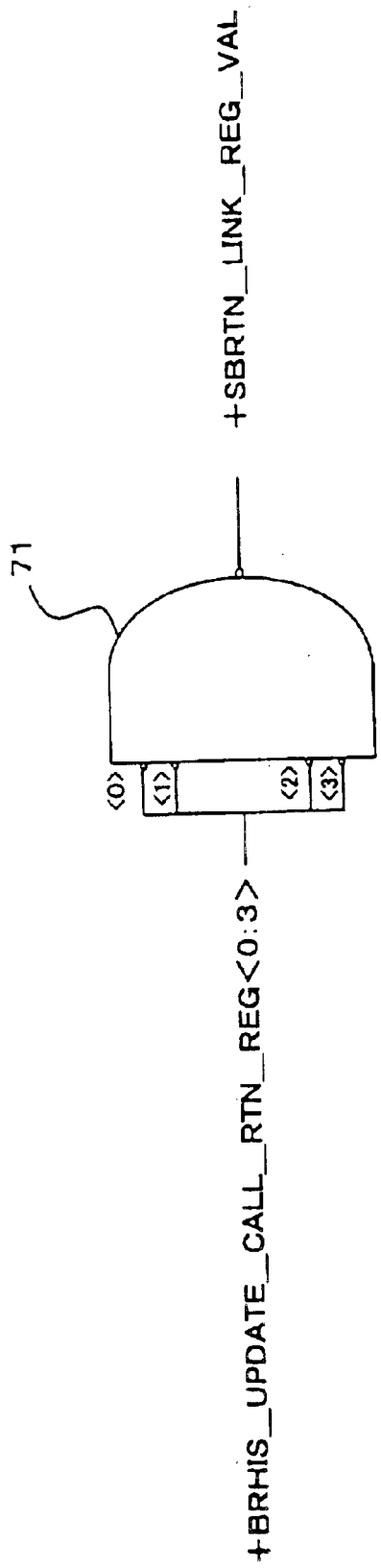
FIG. 9 shows a first identifying circuit.

Therefore, a control signal which becomes valid only if a transmitted register number is not "0" is generated by arranging an identifying circuit shown in FIG. 9 within the branch predicting mechanism 22. In FIG. 9, a NAND circuit 71 obtains the logical product of the negation of the four bits of the signal +BRHIS_UPDATE_CALL_RTN_REG<0:3>, and outputs the negation of the logical product as a signal +SBRTN_LINK_REG_VAL.

Accordingly, this output signal becomes a logic "1" only if the register number represented by the signal +BRHIS_UPDATE_CALL_RTN_REG<0:3> is not "0", which represents that the link register is valid. Control of the link stack 33 with this signal will be described later.

Even if a particular number other than "0" is used as the number of the branch destination address register, which represents a branch instruction by which a branch is not taken, a similar control signal is generated with a circuit similar to that shown in FIG. 9.

Furthermore, since the bassm instruction available as a subroutine call is implemented not by hardwired but by a microcode, this is not registered to the branch history 34 and its information is not transmitted when the branch history information is updated. Alternatively, the signal +D_BASSM which is shown in FIG. 5 and generated at the time of decoding is transmitted to the branch predicting mechanism 22.

Figure 10:
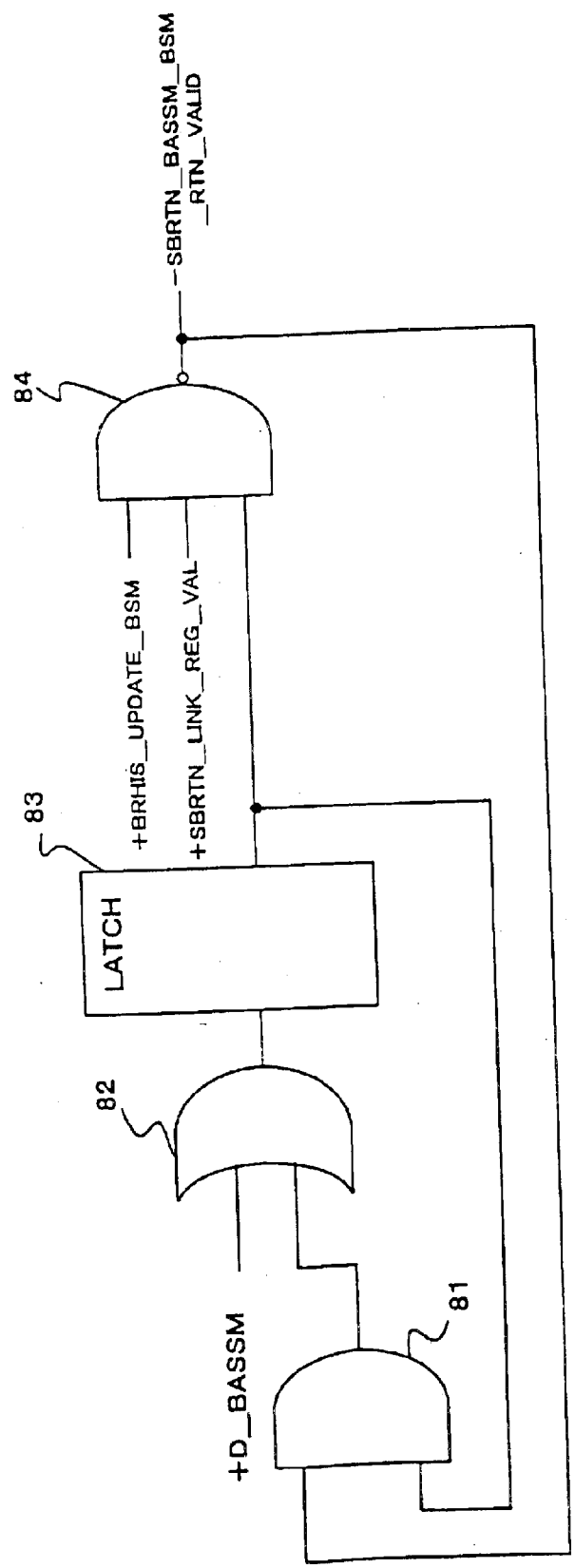
FIG. 10 shows a second identifying circuit.

Therefore, control for the bassm instruction is performed by arranging an identifying circuit shown in FIG. 10 in the branch predicting mechanism 22. Here, the return instruction corresponding to the bassm instruction is assumed to be only bsm.

In FIG. 10, an AND circuit 81 outputs the logical product of the output of a latch circuit 83 and that of a NAND circuit 84 to an OR circuit 82. The OR circuit 82 outputs the logical sum of the input signal +D_BASSM and the output signal of the AND circuit 81 to the latch circuit 83. The latch circuit 83 substantially performs the operations of a set/reset flip-flop, latches the output signal of the OR circuit 82, and outputs the latched signal to the NAND circuit 84.

The NAND circuit 84 outputs the negation of the logical product of the signal +BRHIS_UPDATE_BSM shown in FIG. 5, the control signal +SBRTN_LINK_REG_VAL shown in FIG. 9, and the output signal of the latch circuit 83 as a signal −SBRTN_BASSM_BSM_RTN_VALID. This signal −SBRTN_BASSM_BSM_RTN_VALID represents that the executed bsm instruction is the return instruction corresponding to the above described bassm instruction if it is a logic "0".

With such an identifying circuit, if a bassm instruction to be branched is executed, the signal +D_BASSM becomes a logic "1" and also the output of the latch circuit 83 becomes a logic "1". When the signal +BRHIS_UPDATE_BSM becomes a logic "1 upon completion of the execution of the bsm instruction while the output of the latch circuit 83 and the signal +SBRTN_LINK_REG_VAL shown in FIG. 9 are a logic "1", the executed bsm instruction is identified as the return instruction corresponding to the above described bassm instruction.

Because the signal −SBRTN_BASSM_BSM_RTN_VALID becomes a logic "0" at this time, also the output of the AND circuit 81 becomes a logic "0". Since also the signal +D_BASSM is a logic "0", the output of the latch circuit 83 also becomes a logic "0".

As described above, the output signal of the latch circuit 83 is used as a predetermined flag which represents that the bassm and the bsm instructions are detected. This flag is set when a bassm instruction to be branched is detected, and is reset when the corresponding bsm instruction is detected.

Furthermore, also a signal +SBRTN_BASSM_BSM_RTN_VALID not shown is generated simultaneously with the signal −SBRTN_BASSM_BSM_RTN_VALID. This signal +SBRTN_BASSM_BASM_RTN_VALID corresponds to the negation of the signal −SBRTN_BASSM_BSM_RTN_VALID, and represents that an executed bsm instruction is the return instruction corresponding to the above described bassm instruction if it is a logic "1".

Thus identified bsm instruction corresponding to the bassm instruction is no longer recognized to be an instruction equivalent to a return in the branch history 34 or on the return address stack 35. This is because the bassm instruction itself is not registered as an instruction equivalent to a call.

The branch predicting mechanism 22 determines instructions equivalent to subroutine call/return with the signals transmitted from the branch instruction execution processing circuit 25 and the particular control signals generated by the identifying circuits shown in FIGS. 9 and 10.

FIG. 11 shows a determining circuit within the branch predicting mechanism 22. In this figure, an input signal −BRHIS_UPDATE_SUBROUTINE_RTN corresponds to the negation of the signal +BRHIS_UPDATE_SUBROUTINE_RTN shown in FIG. 5.

An input signal +RTN_LINK_REG_STK0<0:3> represents the register number stored in the top entry of the link stack 33. An input signal +SBRTN_LINK_REG_EQ_E becomes a logic "1" if the signal +BRHIS_UPDATE_CALL_RTN_REG<0:3> shown in FIG. 5 represents the register number "14", and becomes a logic "0" if the signal +BRHIS_UPDATE_CALL_RTN_REG<0:3> represents the other numbers.

An AND circuit 91 outputs to an AND circuit 92 the logical product of the signal +BRHIS_UPDATE_SUBROUTINE_CALL shown in FIG. 5, and the signal +SBRTN_LINK_REG_VAL shown in FIG. 9. The AND circuit 92 outputs the logical product of the output signal of the AND circuit 91 and the signal BRHIS_UPDATE_SUBROUTINE_RTN as a signal +BR_COMP_SUBROUTINE_CALL.

This signal +BR_COMP_SUBROUTINE_CALL is used as a flag which represents an instruction equivalent to a subroutine call (a subroutine call flag) in the branch predicting mechanism 22. If this flag is a logic "1", the instruction executed by the branch instruction execution processing circuit 25 is determined to be an instruction equivalent to a subroutine call. If the executed instruction specifies the register having the number "0" as a link register, this flag becomes a logic "0" and the instruction is determined not to be an instruction equivalent to a subroutine call.

An EXNOR circuit 101 makes a comparison between the signal +BRHIS_UPDATE_CALL_RTN_REG<0:3> shown in FIG. 5 and the signal +RTNLINK_REGSTK0<0:3>, and outputs the negation of the exclusive logical sum of the two signals. An OR circuit 102 outputs the logical sum of the output signal of the EXNOR circuit 101 and the signal +SBRTN_LINK_REG_EQ_E.

Then, an AND circuit 103 outputs the logical product of the signal +BRHIS_UPDATE_SUBROUTINE_RTN shown in FIG. 5, the signal +SBRTN_LINK_REG_VAL shown in FIG. 9, the signal −SBRTN_BASSM_BSM_RTN_VALID shown in FIG. 10, and the output signal of the OR circuit 102 as a signal +BR_COMP_SUBROUTINE_RTN.

This signal +BR_COMP_SUBROUTINE_RTN is used as a flag which represents an instruction equivalent to a subroutine return (a subroutine return flag) in the branch predicting mechanism 22. If this flag is a logic "1", the instruction executed by the branch instruction execution processing circuit 25 is determined to be an instruction equivalent to a subroutine return. This determination operation is performed before the corresponding branch history information is registered to the branch history 34 or the return address stack 35.

The subroutine return determining circuit composed of the EXNOR circuit 101, the OR circuit 102, and the AND circuit 103 corresponds to the comparing circuit 32 shown in FIG. 3. With this determining circuit, the number of the branch destination address register in the executed instruction which can possibly be an instruction equivalent to a subroutine return is compared with the top entry of the link stack 33. If they match, the executed instruction is determined to be an instruction equivalent to a subroutine return.

Note that, however, the bsm instruction corresponding to the bassm instruction is not handled as an instruction equivalent to a return in the branch predicting mechanism 22 as described above. Therefore, the output of the AND circuit 103 is suppressed by the signal −SBRTN_BASSM_BSM_RTN_VALID.

Furthermore, the register having the number "14" is customarily used as a branch destination address register in a subroutine return in many cases. Therefore, if this register is used as the branch destination address register, an executed instruction is determined to be an instruction equivalent to a subroutine return with the signal +SBRTN_LINK_REQ_EQ_E regardless of the result of the comparison made by the EXNOR circuit 101.

Also if a particular number other than "14" is used as the number of the branch destination address register, which represents an instruction equivalent to a subroutine return, similar control is performed by a circuit similar to that shown in FIG. 11.

The link stack 33 performs push and pop operations by the control circuit shown in FIG. 12 with thus generated subroutine call and return flags. Here, it is assumed that the link stack 33 is composed of two entries, and the input signals +RTN_LINK_REG_STK0<0:3> and +RTN_LINK_REG_STK1<0:3> respectively represent the register numbers stored in the first entry (top entry 0) and the second entry (entry 1).

An input signal −SBRTN_LINK_REG_EQ_E corresponds to the negation of the signal +SBRTN_LINK_REQ_EQ_E shown in FIG. 11. An input signal +BRHIS_UPDATE_TAKEN becomes a logic "1" when a branch by a branch instruction is taken and branch history information is updated.

First of all, an AND circuit 111 outputs the logical product of the above described two signals. An AND circuit 112 outputs the logical product of the flag +BR_COMP_SUBROUTINE_CALL shown in FIG. 11 and the output signal of the AND circuit 111 as an operation signal +PUSH_RTN_STACK_LINK_REG. This signal is used to instruct the push operations of the link stack 33 and the return address stack 35, and becomes a logic "1" when an instruction equivalent to a subroutine call is executed and the branch history information is updated.

An AND circuit 113 outputs the logical product of the flag +BR_COMP_SUBROUTINE_RTN shown in FIG. 11 and the output signal of the AND circuit 111 as an operation signal +POP_RTN_STACK_LINK_REG. This signal is used to instruct the pop operations of the link stack 33 and the return address stack 35, and becomes a logic "1" when an instruction equivalent to a subroutine return is executed and the branch history information is updated.

Here, suppose that the instruction equivalent to a subroutine call, which specifies "14" as the number of the link register, and the instruction equivalent to a subroutine return, which specifies "14" as the number of the branch destination address register always make a call/return instruction pair. In this case, the correspondence between the call and the return instructions can be extracted without using the link stack 33.

Therefore, the push and the pop operation signals are suppressed by using the signal −SBRTN_LINK_REQ_EQ_E in order not to operate the link stack 33 in such a case. As a result, the entries of the link stack 33 can be prevented from being wasted, thereby realizing efficient operations even with a fewer number of stages.

Then, an AND circuit 114 outputs the logical product of the signal +BRHIS_UPDATE_CALL_RTN_REG<0:3> shown in FIG. 5, and an operation signal +PUSH_RTN_STACK_LINK_REG. An AND circuit 115 outputs the logical product of the signal +RTN_LINK_REG_STK1<0:3> and an operation signal +POP_RTN_STACK_LINK_REG.

An OR circuit 116 outputs the logical sum of the output signals of the AND circuits 114 and 115 as a signal +SET_RTN_LINK_REG_STK0<0:3>. This signal represents the register number set in the top entry of the link stack 33.

Here, the operation signals +PUSH_RTN_STACK_LINK_REG and +POP_RTN_STACK_LINK_REG never become a logic "1" at the same time. Therefore, the OR circuit 116 selectively outputs the output signals of the AND circuits 114 and 115. Accordingly, with the push operation, the number of the link register, which is specified by an instruction equivalent to a subroutine call, is set. In the meantime, with the pop operation, the register number stored in the second entry of the link stack 33 is set.

Besides, an AND circuit 117 outputs the logical product of the signal +RTN_LINK_REG_STKO<0:3> and the operation signal +PUSH_RTN_STACK_LINK_REG as a signal +SET_RTN_LINK_REG_STK1<0:3>. This signal represents the register number set in the second entry of the link stack 33. In the push operation, this number matches the register number stored in the top entry of the link stack 33.

Figure 13:
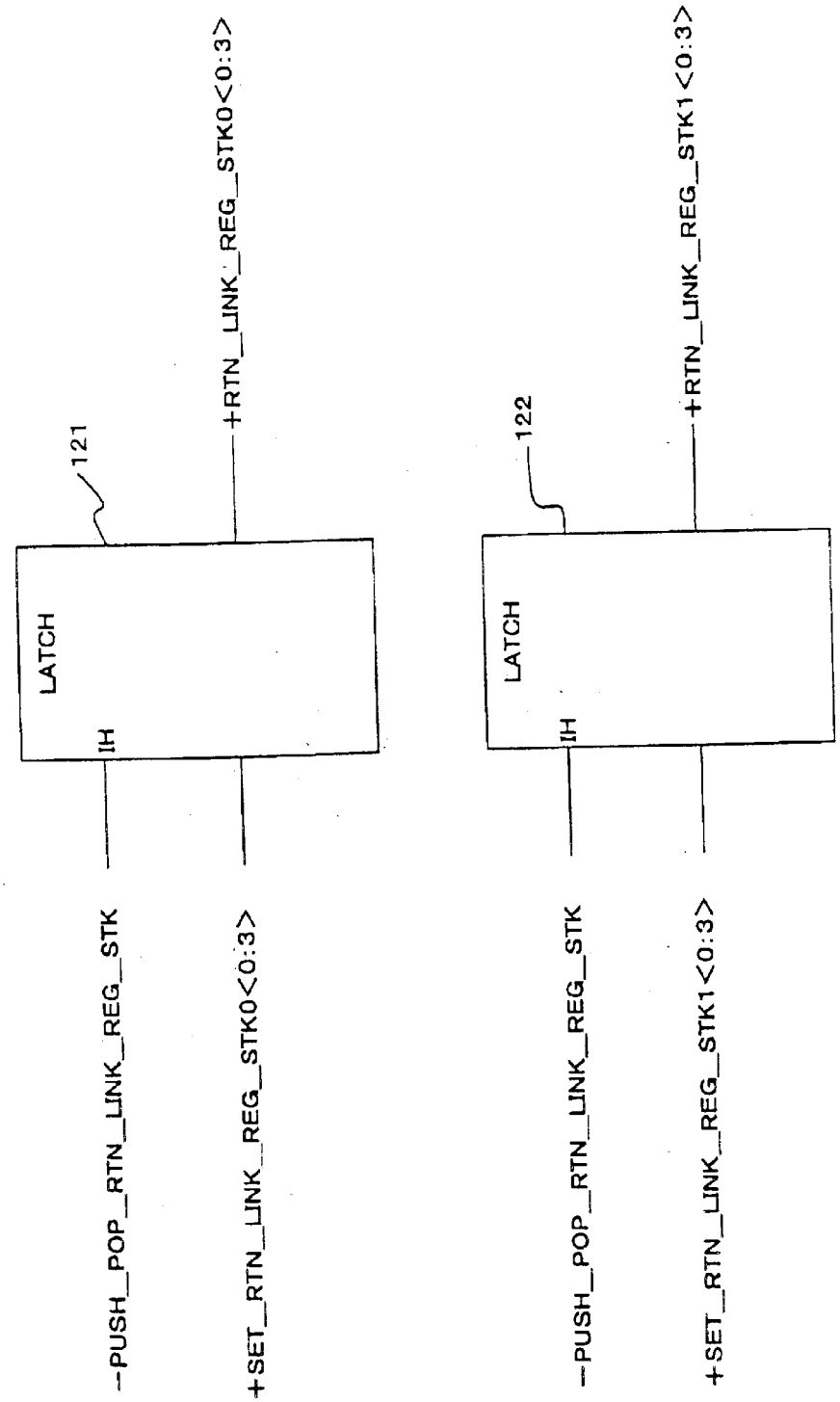
FIG. 13 shows a latch circuit.

FIG. 13 shows latch circuits storing a register number within the link stack 33. In this figure, an input signal −PUSH_POP_RTN_LINK_REG_STK becomes a logic "1" upon termination of the push or the pop operation.

A latch circuit 121 latches the signal +SET_RTN_LINK_REG_STK0<0:3> as the top entry, and outputs the latched signal as the signal +RTN_LINK_REG_STK0<0:3> shown in FIG. 12. In the meantime, a latch circuit 122 latches the signal +SET_RTN_LINK_REG_STK1<0:3> shown in FIG. 12 as the second entry, and outputs the latched signal as the signal +RTN_LINK_REG_STK1<0:3> shown in FIG. 12.

When the signal −PUSH_POP_RTN_LINK_REG_STK becomes a logic "1", the registration of the register numbers to these entries is terminated, and the registered register numbers are held until this signal becomes a logic "0".

Meanwhile, the above described lpsw instruction (complicated instruction) can possibly be either of subroutine call and return instructions. Therefore, this instruction is considered to possibly cause an improper correspondence between a call and a return. Or, if an interrupt occurs and if it is an interrupt of the type which does not return to an original program after the interrupt is processed, this interrupt is also considered to cause an improper correspondence between a call and a return.

Accordingly, if such an event (instruction, interrupt, etc.) occurs, all of the entries of the link stack 33 and the return address stack 35 are cleared and the stored information are invalidated at the time of the execution of the instruction or the interrupt.

Figure 14:
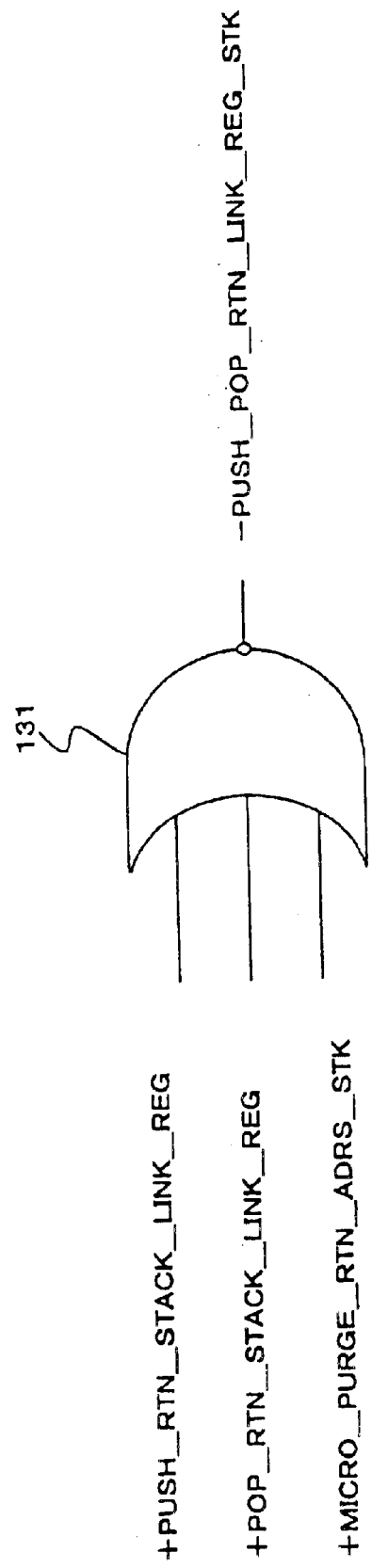
FIG. 14 shows an invalidating circuit.

FIG. 14 shows an invalidating circuit within the branch predicting mechanism 22. In this figure, an input signal +MICRO_PURGE_RTN_ADRS_STK is a signal which clears the entries of the link stack 33 and the return address stack 35. This signal becomes a logic "1" when an instruction or an interrupt, which can possibly cause an improper correspondence between a call and a return, occurs.

A NOR circuit 131 outputs the negation of the logical sum of the operation signals +PUSH_RTN_STACK_LINK_REG and +POP_RTN_STACK_LINK_REG, which are shown in FIG. 12, and a signal +MICRO_PURGE_RTN_ADRS_STK as the signal −PUSH_POP_RTN_LINK_REG_STK shown in FIG. 13.

Accordingly, if the signal +MICRO_PURGE_ADRS_STK becomes a logic "1", the signal −PUSH_POP_RTN_LINK_REG_STK becomes a logic "0", so that the register numbers stored by the latch circuits 121 and 122 shown in FIG. 13 are cleared.

Furthermore, when an instruction equivalent to a subroutine return, which does not return to a return destination corresponding to a subroutine call, that is, the instruction address immediately succeeding an instruction equivalent to a subroutine call, is recognized, a flag indicating that the return destination of the instruction equivalent to the subroutine return differs can be set in the branch history 34.

Figure 15:
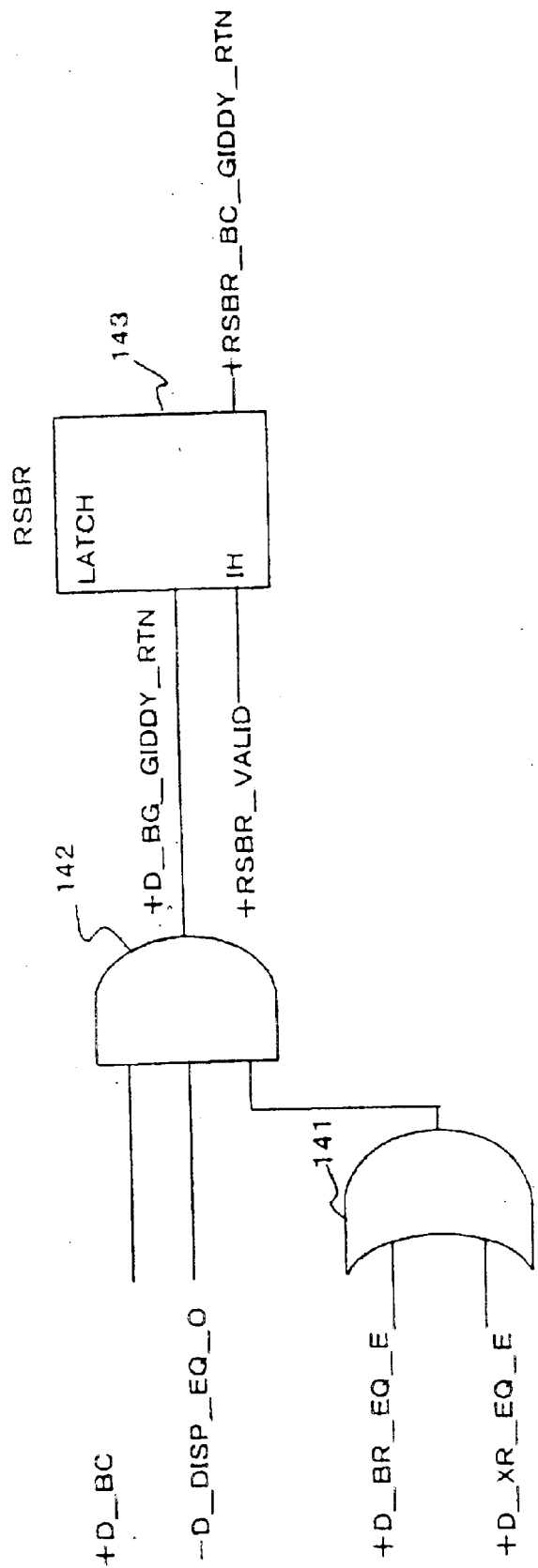
FIG. 15 shows a flag generating circuit.

FIG. 15 shows the circuit generating such a flag in the RSBR 36. In this figure, an input signal +D_BC becomes a logic "1" when an operation code "bc" is detected by the decoder 23. An input signal −D_DISP_EQ_0 becomes a logic "1" if the displacement specified by an instruction is not "0".

Additionally, input signals +D_BR_EQ_E and +D_XR_EQ_E become a logic "1" respectively when the numbers of base and index registers specified by instructions are "14". These signals are output from the decoder 23 to the RSBR 36.

An OR circuit 141 outputs the signal representing the logical sum of the signals +D_BR_EQ_E and +D_XR_EQ_E. An AND circuit 142 outputs the logical product of the signals +D_BC and −D_DISP_EQ_0, and the output signal of the OR circuit 141 as a signal +D_BC_GIDDY_RTN.

A latch circuit 143 latches the signal +D_BC_GIDDY_RTN from the OR circuit 141, and outputs the latched signal as a signal +RSBR_BC_GIDDY_RTN. This signal is held by the latch circuit 143 while the corresponding RSBR 36 is valid, and is used as a flag indicating that the return destination of an instruction equivalent to a subroutine return differs.

Figure 16:
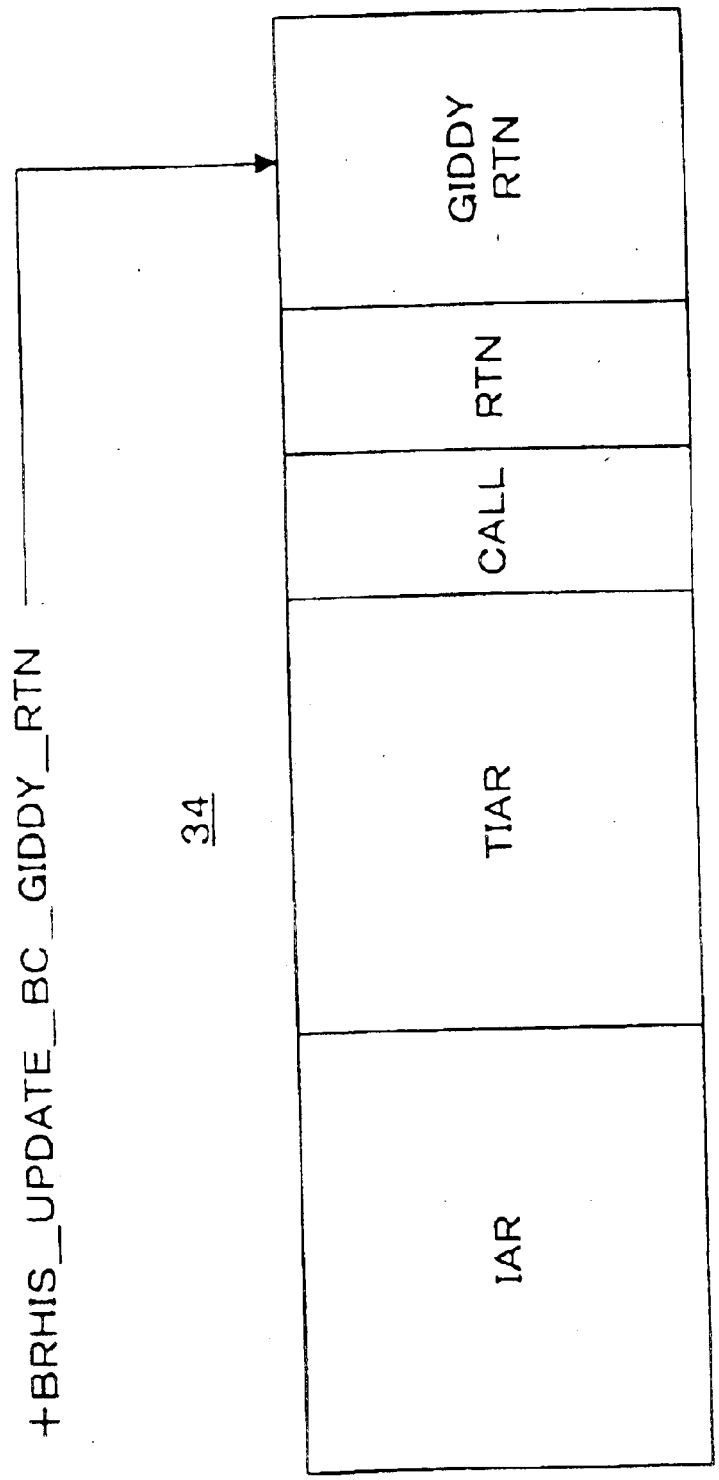
FIG. 16 shows an entry registered to a branch history.

This flag +RSBR_BC_GIDDY_RTN is transmitted to the branch predicting mechanism 22 as a signal +BRHIS_UPDATE_BC_GIDDY_RTN, and is set in a flag GIDDY RTN in the entry of the branch history 34 as shown in FIG. 16.

The entry in the branch history 34 shown in FIG. 16 stores a branch instruction address IAR, a branch destination address TIAR, and flags CALL and RTN in addition to the flag GIDDY RTN. The flags CALL and RTN respectively correspond to a subroutine call flag and a subroutine return flag.

For example, if a branch instruction "bc m. d(14)" the displacement of which is not "0" is decoded, the signal +D_BC_GIDDY_RTN becomes a logic "1", so that the flag +RSBR_BC_GIDDY_RTN is set. Accordingly, when this branch instruction is registered to the branch history 34, a logic "1" is stored in the corresponding flag GIDDY RTN.

If this flag GIDDY RTN is set at the time of the branch prediction made by the predicting circuit 31, the return address stack 35 performs a pop operation similar to that at the time of the prediction of a return instruction. However, the predicting circuit 31 outputs not the branch destination address popped from the return address stack 35, but the branch destination address registered to the branch history 34 as a predicted branch destination address. Accordingly, the instruction at the branch destination predicted by the branch history 34 is fetched, and the result of the prediction made by the return address stack 35 is discarded.

In the above described preferred embodiment, by making a comparison between the number of the link register registered to the link stack 33 and that of the branch destination address register in an executed instruction (or an instruction to be executed), whether or not this instruction is an instruction equivalent to a subroutine return is determined. As another preferred embodiment other than the above described one, a similar determination may be made by making a comparison between the return address registered to the return address stack 35 and the branch destination address of an executed instruction (or an instruction to be executed) without using the link stack 33.

With this method, when an instruction equivalent to a return, which does not return to the instruction immediately succeeding the corresponding call instruction, such as the above described bc instruction, etc., appears, the correspondence of a call/return pair to be recognized becomes improper, so that the performance inherent in the return address stack 35 is not fully utilized. However, this method has an advantage that there is no need to newly arrange the link stack 33.

FIG. 17 shows the circuit which makes such a determination within the branch predicting mechanism 22. In this figure, a signal +BRHIS_UPDATE_TIAR represents the branch destination address of an instruction which can possibly be an instruction equivalent to a subroutine return, and is transmitted from the RSBR 36.

A comparing circuit 151 makes a comparison between this signal +BRHIS_UPDATE_TIAR and the top entry (entry 0) of the return address stack 35, and outputs the signal of the logic "0" if they match. Here, the return address stack 35 is illustrated as a stack having "n" stages. An AND circuit 152 outputs the logical product of the signal +BRHIS_UPDATE_SUBROUTINE_RTN in FIG. 5 and the output signal of the comparing circuit 151 as the signal +BR_COMP_SUBROUTINE_RTN shown in FIG. 12.

The determining circuit shown in FIG. 17 can possibly be a substitute for the determining circuit for an instruction equivalent to a subroutine return, which is shown in FIG. 11, and can generate a subroutine return flag without referencing the entries of the link stack 33. Accordingly, the link stack 33 becomes unnecessary in this case.

In the above described preferred embodiments, the link stack 33 and the return address stack 35 are mainly assumed to be stacks having two stages. However, a similar control can be performed also when stacks having an arbitrary number of stages are used. Furthermore, a subroutine call/return instruction pair can be recognized by comparing arbitrary information specifying the return address of a subroutine, except for a register number or an instruction address.

According to the present invention, a correct subroutine call/return instruction pair can be dynamically extracted in an information processing device having a branch predicting mechanism such as a return address stack, etc. Accordingly, an improper correspondence of a call/return pair in the branch predicting mechanism can be prevented, thereby improving the accuracy of the branch prediction of an instruction equivalent to a subroutine return.

What is claimed is:

1. A branch predicting device, comprising:
    a storing circuit storing information specifying a return address of a subroutine when an instruction equivalent to a subroutine call is detected;
    a comparing circuit making a comparison between information specifying a branch destination address of an instruction which can possibly be an instruction equivalent to a subroutine return and the information specifying the return address stored in said storing circuit, and outputting a result of the comparison, when the instruction which can possibly be the instruction equivalent to the subroutine return is detected; and
    an identifying circuit identifying an instruction equivalent to a subroutine return, which corresponds to the instruction equivalent to the subroutine call, based on the result of the comparison, wherein the predicted branch is the branch of the instruction equivalent to the subroutine return in an architecture for which a particular instruction for a subroutine return is not prepared,
    wherein said storing circuit stores a register number of a link register, which is specified by the instruction equivalent to the subroutine call, as the information specifying the return address,
    wherein said storing circuit stores the return address of the subroutine as the information specifying the return address, and
    wherein only taken branch instruction is registered.

2. The branch predicting device according to claim 1, further comprising
    a predicting circuit storing branch history information for a branch prediction, wherein
    said comparing circuit makes the comparison between the information specifying the branch destination address and the information specifying the return address, when the branch history information is registered to said predicting circuit.

3. The branch predicting device according to claim 1, further comprising:
    a predicting circuit storing branch history information for a branch prediction; and
    a setting circuit setting in said predicting circuit a flag indicating that a return destination of a detected instruction equivalent to a subroutine return differs, when an instruction equivalent to a subroutine return, which does not return to an instruction address immediately succeeding the instruction equivalent to the subroutine call, is detected.

4. The branch predicting device according to claim 3, wherein
    said predicting circuit comprises a return address stack circuit storing the return address of the subroutine, pops said return address stack circuit if the flag is recognize at the time of a branch prediction, and does not use a popped return address as a predicted branch destination.

5. A branch predicting device, comprising:
    a stack circuit storing information specifying a return address of a subroutine;
    a push circuit pushing the information specifying the return address onto said stack circuit, when an instruction equivalent to a subroutine call is detected;
    a comparing circuit making a comparison between information specifying a branch destination address of an instruction which can possibly be an instruction equivalent to a subroutine return and the information specifying the return address stored in a top entry of said stack circuit, and outputting a result of the comparison, when the instruction which can possibly be the instruction equivalent to the subroutine return is detected; and an identifying circuit identifying an instruction equivalent to a subroutine return, which corresponds to the instruction equivalent to the subroutine call, based on the result of the comparison, wherein the predicted branch is the branch of the instruction equivalent to the subroutine return in an architecture for which a particular instruction for a subroutine return is not prepared, and wherein only a taken branch instruction is thus registered.

6. The branch predicting device according to claim 5, further comprising a pop circuit popping said stack circuit when said identifying circuit identifies the instruction which can possibly be the instruction equivalent to the subroutine return as the instruction equivalent to the subroutine return, and a branch by the instruction equivalent to the subroutine return is taken.

7. A branch predicting device, comprising:

a stack circuit storing information specifying a return address of a subroutine;

a push circuit pushing the information specifying the return address onto said stack circuit, when an instruction equivalent to a subroutine call is detected;

a comparing circuit making a comparison between information specifying a branch destination address of an instruction which can possibly be an instruction equivalent to a subroutine return and the information specifying the return address stored in a top entry of said stack circuit, and outputting a result of the comparison, when the instruction which can possibly be the instruction equivalent to the subroutine return is detected; and an identifying circuit identifying an instruction equivalent to a subroutine return, which corresponds to the instruction equivalent to the subroutine call, based on the result of the comparison, and said identifying circuit identifies the instruction which can possibly be the instruction equivalent to the subroutine return as the instruction equivalent to the subroutine return regardless of the result of the comparison, if the register number of the branch destination address register corresponds to a particular register commonly designated as the branch destination address register, wherein the predicted branch is the branch of the instruction equivalent to the subroutine return in an architecture for which a particular instruction fore subroutine return is not prepared, and wherein only a taken branch instruction is registered.

8. A branch predicting device, comprising:

a stack circuit storing information specifying a return address of a subroutine;

a push circuit pushing the information specifying the return address onto said stack circuit, when an instruction equivalent to a subroutine call is detected;

a comparing circuit making a comparison between information specifying a branch destination address of an instruction which can possibly be an instruction equivalent to a subroutine return and the information specifying the return address stored in a top entry of said stack circuit, and outputting a result of the comparison, when the instruction which can possibly be the instruction equivalent to the subroutine return is detected; and an identifying circuit identifying an instruction equivalent to a subroutine return, which corresponds to the instruction equivalent to the subroutine call, based on the result of the comparison, wherein said push circuit does not push the register number of the link register onto said stack circuit if the register number of the link register corresponds to a particular register commonly designated as the branch destination address register, wherein the predicted branch is the branch of the instruction equivalent to the subroutine return in an architecture for which a particular instruction for a subroutine return is not prepared, and wherein only a taken branch instruction is registered.

9. A branch predicting device, comprising:

a storing circuit storing information specifying a return address of a subroutine when an instruction equivalent to a subroutine call is detected;

a comparing circuit making a comparison between information specifying a branch destination address of an instruction which can possibly be an instruction equivalent to a subroutine return and the information specking the return address stored in said storing circuit, and outputting a result of the comparison, when the instruction which can possibly be the instruction equivalent to the subroutine return is detected;

an identifying circuit identifying an instruction equivalent to a subroutine return, which corresponds to the instruction equivalent to the subroutine call, based on the result of the comparison; and a circuit invalidating the information stored in said storing circuit when an event which causes a correspondence between a subroutine call and a subroutine return to be improper, wherein the predicted branch is the branch of the instruction equivalent to the subroutine return in an architecture for which a particular instruction for a subroutine return is not prepared, and wherein only a taken branch instruction is registered.

10. A branch predicting device, comprising:

a storing circuit storing information specifying a return address of a subroutine when an instruction equivalent to a subroutine call is detected;

a comparing circuit making a comparison between information specifying a branch destination address of an instruction which can possibly be an instruction equivalent to a subroutine return and the information specifying the return address stored in said storing circuit, and outputting a result of the comparison, when the instruction which can possibly be the instruction equivalent to the subroutine return is detected; and an identifying circuit identifying an instruction equivalent to a subroutine return, which corresponds to the instruction equivalent to the subroutine call, based on the result of the comparison, a predicting circuit storing branch history information for a branch prediction;

a circuit performing a control such that a predetermined flag is set when an instruction equivalent to a subroutine call, which is unregistered in the branch history of said predicting circuit, is detected, the predetermined flag is reset when an instruction equivalent to a subroutine return, which corresponds to the unregistered instruction equivalent to the subroutine call, is detected, and the instruction equivalent to the subroutine return corresponding to the unregistered instruction is not identified as an instruction equivalent to a subroutine return in said predicting circuit, the predicting circuit predicting the branch responsive to the identifying and the control, wherein the predicted branch is the branch of the instruction equivalent to the subroutine return in an architecture for which a particular instruction for a subroutine return is not prepared, and wherein only a taken branch instruction is registered.

11. A branch predicting device, comprising:

a return address stack circuit storing a return address of a subroutine when an instruction equivalent to a subroutine cell is detected;

a comparing circuit making a comparison between a branch destination address of an instruction which can possibly be an instruction equivalent to a subroutine return, and the return address stored in said return address stack circuit, and outputting a result of the comparison, when the instruction which can possibly be the instruction equivalent to the subroutine return is detected; and an identifying circuit identifying an instruction equivalent to a subroutine return, which corresponds to the instruction equivalent to the subroutine call, based on the result of the comparison, wherein the predicted branch is the branch of the instruction equivalent to the subroutine return in an architecture for which a particular instruction for a subroutine return is not prepared, and wherein only a taken branch instruction is thus registered.

12. A branch predicting method, comprising:

registering information specifying a return address of a subroutine when an instruction equivalent to a subroutine call is detected;

making a comparison between information specifying a branch destination address of an instruction which can possibly be an instruction equivalent to a subroutine return and the registered information specifying the return address, when the instruction which can possibly be the instruction equivalent to the subroutine return is detected;

identifying the instruction which can possibly be the instruction equivalent to the subroutine return as an instruction equivalent to a subroutine return, which corresponds to the instruction equivalent to the subroutine call, if the information specifying the branch destination address and the information specifying the return address match;

identifying the instruction which can possibly be the instruction equivalent to the subroutine return not as the instruction equivalent to the subroutine return, which corresponds to the instruction equivalent to the subroutine call, if the information specifying the branch destination address and the information specifying the return address do not match; and making a branch prediction by using an identification result, wherein the predicted branch is the branch of the instruction equivalent to the subroutine return in an architecture for which a particular instruction for a subroutine return not prepared, and wherein only a taken branch instruction is thus registered.

13. A branch predicting device, comprising:

storing means for storing Information specifying a return address of a subroutine when an instruction equivalent to a subroutine call is detected;

comparing means for making a comparison between information specifying a branch destination address of an instruction which can possibly be an instruction equivalent to a subroutine return and the information specifying the return address stored in said storing means, and for outputting a result of the comparison, when the instruction which can possibly be the instruction equivalent to the subroutine return is detected; and identifying means for identifying an instruction equivalent to a subroutine return, which corresponds to the instruction equivalent to the subroutine call, based on the result of the comparison, wherein the predicted branch is the branch of the instruction equivalent to the subroutine return in an architecture for which a particular instruction for a subroutine return is not prepared, and wherein only a taken branch instruction is thus registered.

14. A branch predicting device, comprising:

stack means for storing information specifying a return address of a subroutine;

push means for pushing the information specifying the return address onto said stack means, when an instruction equivalent to a subroutine call is detected;

comparing means for making a comparison between information specifying a branch destination address of an instruction which can possibly be an instruction equivalent to a subroutine return and the information specifying the return address stored in a top entry of said stack means, and for outputting a result of the comparison, when the instruction which can possibly be the instruction equivalent to the subroutine return is detected; and identifying means for identifying an instruction equivalent to a subroutine return, which corresponds to the instruction equivalent to the subroutine call, based on the result of the comparison, wherein the predicted branch is the branch of the instruction equivalent to the subroutine return in an architecture for which a particular instruction for a subroutine return is not prepared, and wherein only a taken branch instruction is thus registered.

15. A branch predicting device, comprising:

return address stack means for storing a return address of a subroutine when an instruction equivalent to a subroutine call is detected:

comparing means for making a comparison between a branch destination address of an instruction which can possibly be an instruction equivalent to a subroutine return, and the return address stored in said return address stack means, and for outputting a result of the comparison, when the instruction which can possibly be the instruction equivalent to the subroutine return is detected; and identifying means for identifying an instruction equivalent to a subroutine return, which corresponds to the instruction equivalent to the subroutine call, based on the result of the comparison, wherein the predicted branch is the branch of the instruction equivalent to the subroutine return in an architecture for which a particular instruction for a subroutine return is not prepared, and wherein only a taken branch instruction is thus registered.

16. A branch predicting device, comprising:

a storing circuit storing information specifying a return address of a subroutine when an instruction equivalent to a subroutine call is detected;

a comparing circuit comparing information specifying a branch destination address of an instruction which can possibly be an instruction equivalent to a subroutine return and the information specifying the return address stored in said storing circuit, and outputting a comparison result, when the instruction which can possibly be the instruction equivalent to the subroutine return is detected; and an determining circuit determining whether instruction equivalent to a subroutine call is an non-history instruction that does not get recorded in a branch history and determining whether the instruction which can possibly be an instruction equivalent to a subroutine return corresponds to the non-history instruction and outputting a determination result, when the instruction which can possibly be the instruction equivalent to the subroutine return is detected; and a predicting circuit predicting the branch responsive to the comparison result and the determination result, wherein the predicted branch is the branch of the instruction equivalent to the subroutine return in an architecture for which a particular instruction for a subroutine return is not prepared, and wherein only a taken branch instruction is registered.

17. A branch predicting device, comprising:

a storing circuit storing information specifying a return address of a subroutine when an instruction equivalent to a subroutine call is detected;

a comparing circuit comparing information specifying a branch destination address of an instruction which can possibly be an instruction equivalent to a subroutine return and the information specifying the return address stored in said storing circuit, and outputting a comparison result, when the instruction which can possibly be the instruction equivalent to the subroutine return is detected; and an determining circuit determining whether instruction equivalent to a subroutine call is an non-history instruction that does not get recorded in a branch history and determining whether the instruction which can possibly be an instruction equivalent to a subroutine return corresponds to the non-history instruction and outputting a determination result, when the instruction which can possibly be the instruction equivalent to the subroutine return is detected; and a predicting circuit predicting the branch responsive to the comparison result and the determination result, wherein the predicted branch is the branch of the instruction equivalent to the subroutine return in an architecture for which a particular instruction for a subroutine is not prepared, and wherein only a taken branch instruction is registered.

* * * * *

UNITED STATES PATENT AND TRADEMARK OFFICE
CERTIFICATE OF CORRECTION

| | |
|---|---|
| PATENT NO. | : 6,898,698 B1 |
| APPLICATION NO. | : 09/533042 |
| DATED | : May 24, 2005 |
| INVENTOR(S) | : Ryuichi Sunayama et al. |

It is certified that error appears in the above-identified patent and that said Letters Patent is hereby corrected as shown below:

Col. 18, line 29, insert --a-- after "only".

Col. 18, line 54, change "recognize" to --recognized--.

Col. 19, line 51, change "fore" to --for a--.

Col. 20, line 24, change "specking" to --specifying--.

Col. 21, line 17, change "cell" to --call--.

Col. 22, line 2, insert --is-- after "return".

Col. 22, line 5, change "Information" to --information--.

Col. 22, line 52, change ":" to --;--.

Col. 24, line 5, delete "comparing" after "circuit" and insert --make a comparison between--.

Col. 24, line 9, change "said" to --the--; and after "a" insert --result of the--.

Col. 24, line 10, delete "result".

UNITED STATES PATENT AND TRADEMARK OFFICE
CERTIFICATE OF CORRECTION

PATENT NO. : 6,898,698 B1
APPLICATION NO. : 09/533042
DATED : May 24, 2005
INVENTOR(S) : Ryuichi Sunayama et al.

It is certified that error appears in the above-identified patent and that said Letters Patent is hereby corrected as shown below:

Col. 24, line 13, delete lines 13-23 and insert --an identifying circuit identifying an instruction equivalent to a subroutine return, which corresponds to the instruction equivalent to the subroutine call, based on the result of the comparison wherein the predicted branch is the branch of the instruction equivalent to the subroutine return in an architecture not including a particular instruction for a subroutine return, wherein the storing circuit stores the return address of the subroutine as the information specifying the return address, and--.

Signed and Sealed this

First Day of August, 2006

JON W. DUDAS
*Director of the United States Patent and Trademark Office*